(12) United States Patent
Cho et al.

(10) Patent No.: US 12,542,368 B2
(45) Date of Patent: Feb. 3, 2026

(54) MODEM SUPPORTING DIGITAL PRE-DISTORTION, ANTENNA MODULE, AND METHOD FOR OPERATING SAME

(71) Applicant: Samsung Electronics Co., Ltd., Suwon-si (KR)

(72) Inventors: Namjun Cho, Suwon-si (KR); Hyosung Lee, Suwon-si (KR); Junghwan Son, Suwon-si (KR); Hyoseok Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 313 days.

(21) Appl. No.: 18/345,061

(22) Filed: Jun. 30, 2023

(65) Prior Publication Data
US 2024/0006774 A1 Jan. 4, 2024

Related U.S. Application Data

(63) Continuation of application No. PCT/KR2023/009264, filed on Jun. 30, 2023.

(30) Foreign Application Priority Data

Jul. 1, 2022 (KR) .................... 10-2022-0081052
Aug. 18, 2022 (KR) .................... 10-2022-0103654

(51) Int. Cl.
*H01Q 15/00* (2006.01)
*H04B 1/3805* (2015.01)

(52) U.S. Cl.
CPC ....... *H01Q 15/0033* (2013.01); *H04B 1/3805* (2013.01); *H04B 2001/3811* (2013.01)

(58) Field of Classification Search
CPC .. H01Q 15/0033; H01Q 3/267; H04B 1/3805; H04B 2001/3811
See application file for complete search history.

(56) References Cited

U.S. PATENT DOCUMENTS

2008/0049868 A1 2/2008 Brobston
2009/0184763 A1 7/2009 Kim
(Continued)

FOREIGN PATENT DOCUMENTS

KR 20100080108 A 7/2010
KR 10-2017-0085003 A 7/2017
(Continued)

OTHER PUBLICATIONS

PCT International Search Report dated Sep. 26, 2023 for PCT/KR2023/009264.
PCT Written Opinion dated Sep. 26, 2023 for PCT/KR2023/009264.

*Primary Examiner* — Nguyen T Vo
(74) *Attorney, Agent, or Firm* — Nixon & Vanderhye P.C.

(57) ABSTRACT

An antenna module may include antennas, RF chains connected to the antennas, a splitter/combiner connected to the RF chains, a mixer configured to upconvert an IF signal input to the antenna module into a transmission RF signal and output the upconverted signal to the splitter/combiner and/or to downconvert a reception RF signal which is a combination of signals from the RF chains provided from the splitter/combiner, a plurality of first couplers connected between the RF chains and the antennas, a second coupler for measuring a magnitude corresponding to a transmission RF signal before split by the splitter/combiner and/or the reception RF signal combined by the splitter/combiner, and a power detector configured to provide a plurality of magnitudes of a plurality of signals from the plurality of first couplers and a magnitude of a signal from the second coupler.

8 Claims, 24 Drawing Sheets

(56) References Cited

U.S. PATENT DOCUMENTS

| | | |
|---|---|---|
| 2011/0156815 A1 | 6/2011 | Kim et al. |
| 2013/0072142 A1* | 3/2013 | Akula .................. H03G 3/3042 |
| | | 455/129 |
| 2015/0333781 A1 | 11/2015 | Alon et al. |
| 2017/0201019 A1 | 7/2017 | Trotta |
| 2020/0336168 A1 | 10/2020 | Hormis et al. |
| 2021/0075449 A1 | 3/2021 | Lee et al. |
| 2021/0391929 A1 | 12/2021 | Xiao et al. |
| 2022/0021349 A1 | 1/2022 | Yan |
| 2022/0131506 A1 | 4/2022 | Venkitasubramani et al. |
| 2022/0149887 A1 | 5/2022 | Cho et al. |
| 2022/0294542 A1* | 9/2022 | Song ...................... G01R 27/04 |

FOREIGN PATENT DOCUMENTS

| | | |
|---|---|---|
| KR | 10-1815329 B1 | 1/2018 |
| KR | 10-2021-0017533 A | 2/2021 |
| KR | 10-2022-0064874 A | 5/2022 |

* cited by examiner $$\text{Gain\_n} = \frac{\text{TXn Output Coupled Power}}{\text{TX Input Coupled Power / 5}}$$

MODEM SUPPORTING DIGITAL PRE-DISTORTION, ANTENNA MODULE, AND METHOD FOR OPERATING SAME

CROSS REFERENCE TO RELATED APPLICATIONS

This application is a continuation of International Application No. PCT/KR2023/009264 filed on Jun. 30, 2023, designating the United States, in the Korean Intellectual Property Receiving Office, and claiming priority to Korean Patent Application No. 10-2022-0081052 filed on Jul. 1, 2022, and Korean Patent Application No. 10-2022-0103654 filed on Aug. 18, 2022, the disclosures of which are all hereby incorporated by reference herein in their entireties.

BACKGROUND

Field

Various example embodiments relate to a modem supporting digital pre-distortion, an antenna module, and/or a method for operating the same.

Description of Related Art

The 5G communication technology standard has newly defined mobile communication in the mm-Wave band (20 GHz or higher) to achieve a transmission rate that is 10 times higher than that of conventional 4G. Manufacturers who designed circuits/modules focusing on the frequency band within 6 GHz adopted a new front end structure in which an antenna and a transceiver are integrated into one module to support the mm-Wave frequency band. The mm-Wave antenna module included in the UE supporting 5G may include a power amplifier (PA) for amplifying an RF signal for transmission. In a period where the magnitude of the input signal is relatively small, the power amplifier may maintain linearity of the output signal with respect to the input signal. Accordingly, the gain may be maintained as a constant value. Meanwhile, when the magnitude of the input signal is relatively large, the linearity of the power amplifier cannot be maintained and the gain may be compressed.

SUMMARY

To compensate for the loss of linearity as described above, the modem may perform digital predistortion (DPD). In the baseband digital domain, DPD may be technology that applies distortion in a direction that compensates for the characteristics of the compressed gain of the power amplifier (PA) according to the signal level, thereby maintaining linearity of the output signal from the PA.

According to an example embodiment, an antenna module may comprise antennas, radio frequency (RF) chains connected to the antennas, a splitter/combiner connected to the RF chains, a mixer configured to upconvert an intermediate frequency (IF) signal input to the antenna module into a transmission RF signal and output the upconverted signal to the splitter/combiner and/or to downconvert a reception RF signal which is a combination of signals from the RF chains provided from the splitter/combiner, a plurality of first couplers connected between the RF chains and the antennas, a second coupler for measuring a magnitude corresponding to a transmission RF signal before split by the splitter/combiner and/or the reception RF signal combined by the splitter/combiner, and a power detector configured to provide a plurality of magnitudes of a plurality of signals from the plurality of first couplers and a magnitude of a signal from the second coupler. Each of the plurality of first couplers may be disposed between at least the antennas and the splitter/combiner.

According to an example embodiment, a modem may include at least one processor and at least one memory. The at least one memory may store at least one instruction that, when executed by the at least one processor, may enable the modem to identify magnitudes associated with sub reception RF signals respectively applied to RF chains connected to a plurality of antennas and a magnitude associated with a combined reception RF signal of the sub reception RF signals. The at least one memory may store at least one instruction that, when executed by the at least one processor, may enable the modem to identify a difference between a sum of the magnitudes and the magnitude. The at least one memory may store at least one instruction that, when executed by the at least one processor, may enable the modem to identify weights respectively corresponding to the RF chains based on the magnitudes, based on the difference being a threshold or less.

BRIEF DESCRIPTION OF THE DRAWINGS

The foregoing and other features of example embodiments will become more apparent from the following detailed description of embodiments when read in conjunction with the accompanying drawings. In the drawings, like reference numerals refer to like elements.

DETAILED DESCRIPTION

Figure 1:
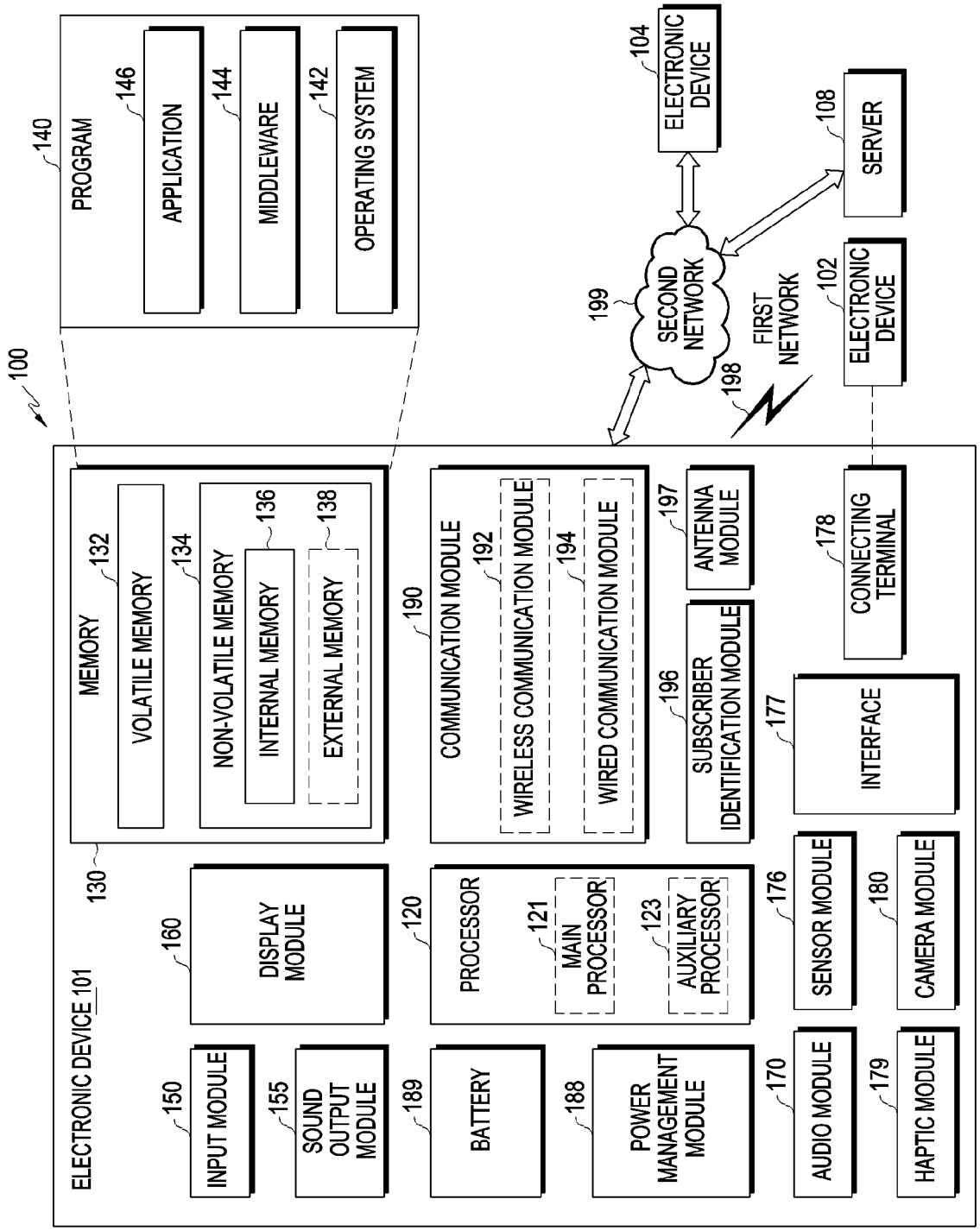
FIG. 1 is a view illustrating an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160 comprising a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
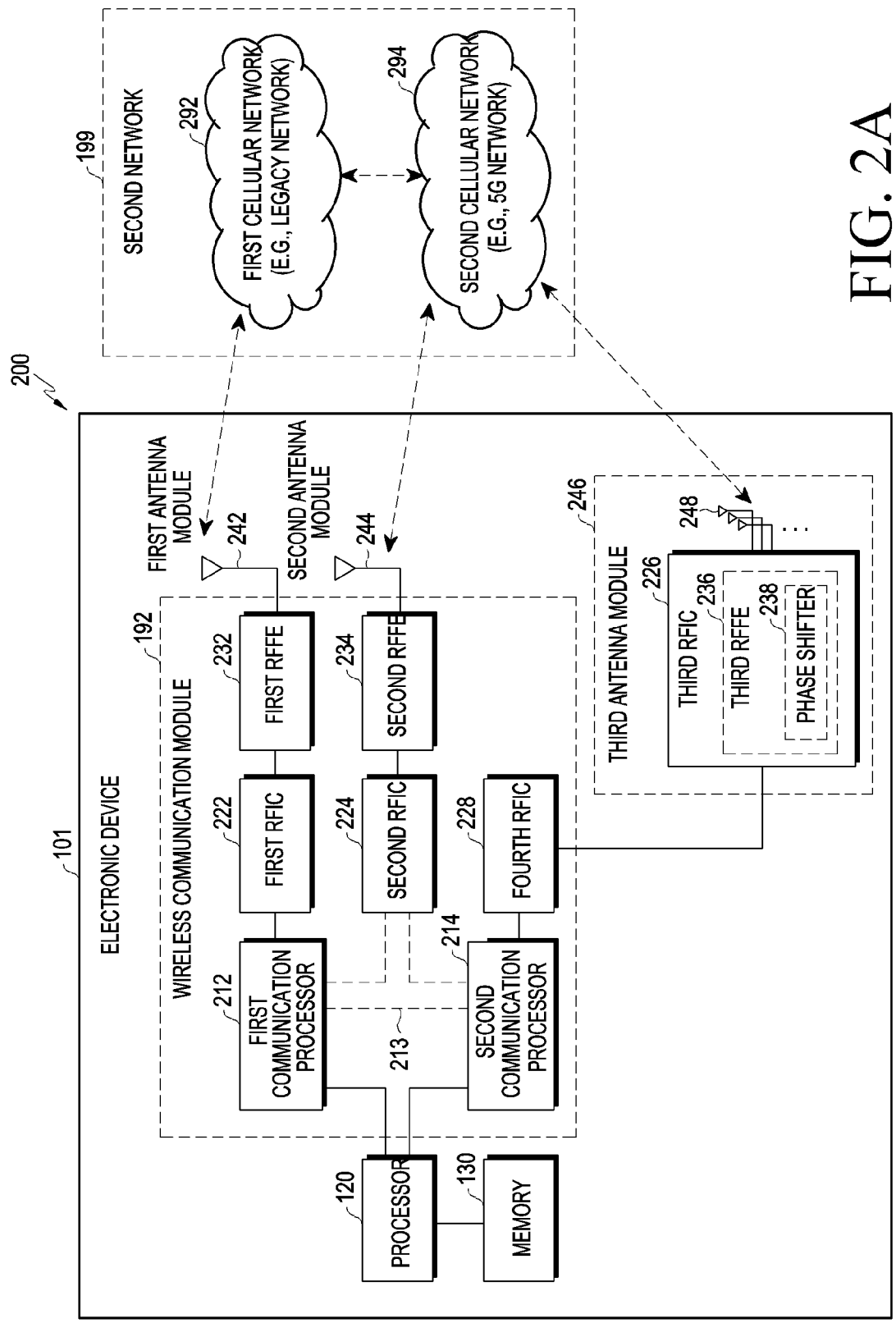
FIG. 2A is a block diagram illustrating an electronic device for supporting legacy network communication and 5G network communication according to various example embodiments.

FIG. 2A is a block diagram 200 illustrating an electronic device 101 for supporting legacy network communication and 5G network communication according to various embodiments. Referring to FIG. 2A, the electronic device 101 may include a first communication processor (CP) 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. The second network 199 may include a first cellular network 292 and a second cellular network 294. According to another embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192 comprising communication circuitry. According to another embodiment, the fourth RFIC 228 may be omitted or be included as part of the third RFIC 226. Each "processor" herein comprises processing circuitry.

The first communication processor (CP) 212 may establish a communication channel of a band that is to be used for wireless communication with the first cellular network 292 or may support legacy network communication via the established communication channel. According to various embodiments, the first cellular network may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

Figure 2B:
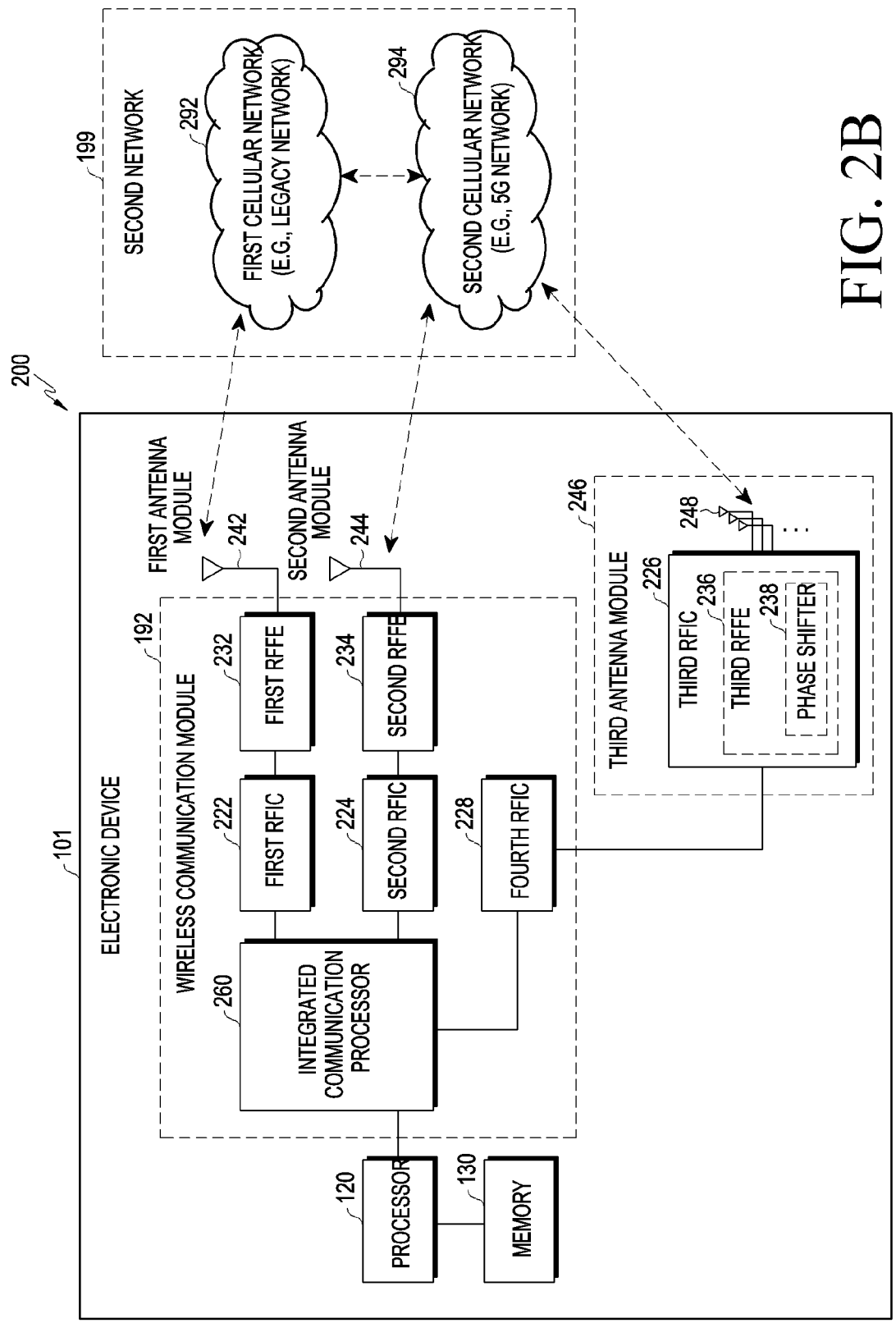
FIG. 2B is a block diagram illustrating an electronic device for supporting legacy network communication and 5G network communication according to various example embodiments.

According to an embodiment, the first communication processor 212 and the second communication processor 214 may be implemented in a single chip or a single package. According to an embodiment, the first communication processor 212 or the second communication processor 214, along with the processor 120, an assistance processor 123, or communication module 190 comprising communication circuitry, may be formed in a single chip or single package. For example, as shown in FIG. 2B, an integrated communication processor 260 may support all of the functions for communication with the first cellular network 292 and the second cellular network 294. A single chip or single package may include, e.g., an internal memory for storing instructions for performing at least some of the operations performed according to various embodiments and/or a processing circuit for executing the instructions.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212 (e.g., see FIG. 2A).

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214 (e.g., see FIG. 2A).

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to various embodiments, when the first RFIC 222 and the second RFIC 224 in FIG. 2A or 2B are implemented as a single chip or a single package, they may be implemented as an integrated RFIC. In this case, the integrated RFIC is connected to the first RFFE 232 and the second RFFE 234 to convert a baseband signal into a signal of a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multiband RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

Figure 3A:
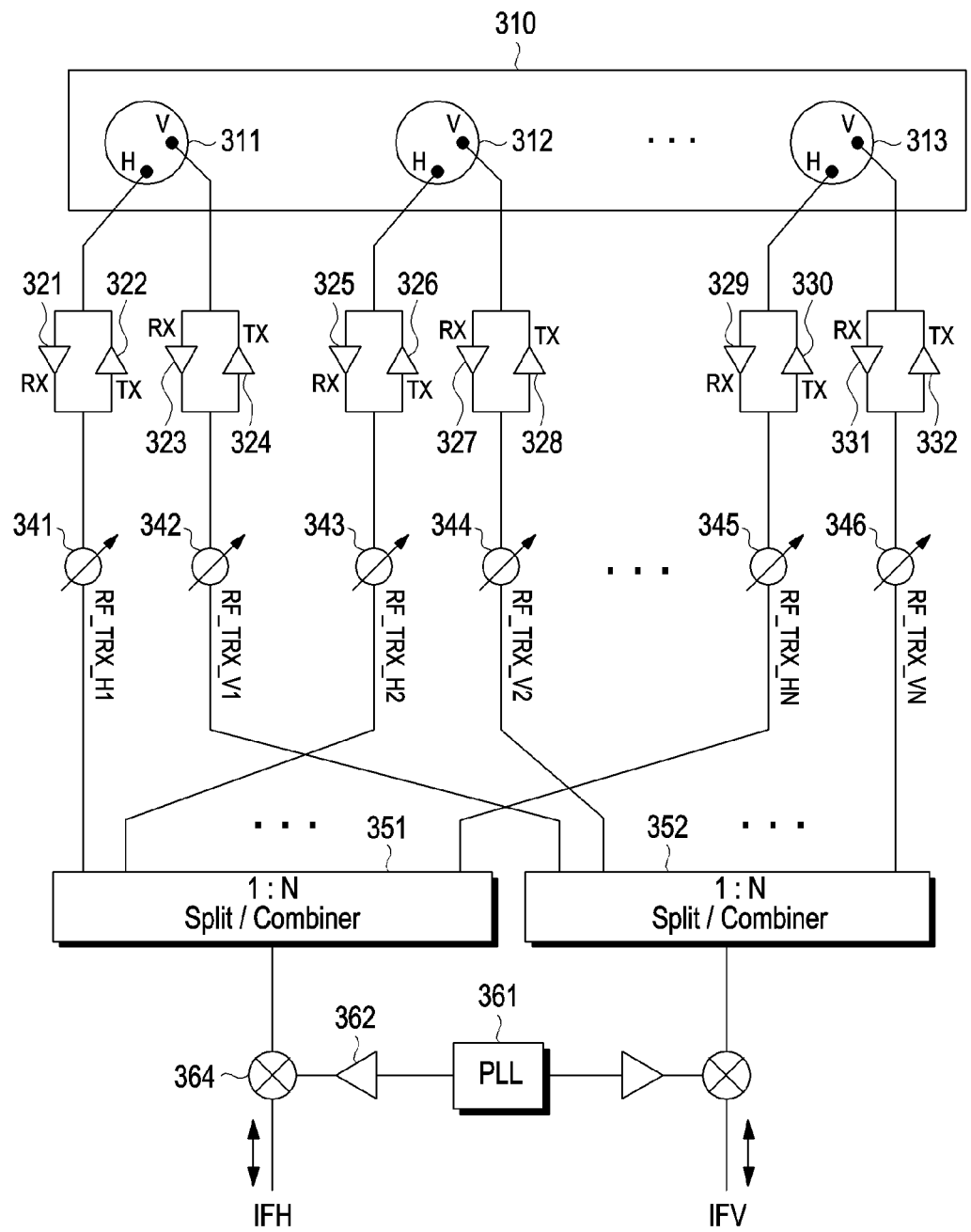
FIG. 3A is a view illustrating an mmWave antenna module according to an example embodiment.

FIG. 3A is a view illustrating an mmWave RF module according to an embodiment.

According to an embodiment, an antenna array 310 may include at least one antenna element 311, 312, and 313. Each of the at least one antenna element 311, 312, and 313 may have (or define) a terminal H for an H-polarized RF signal and a terminal V for a V-polarized RF signal. For example, the terminal H of the first antenna element 311 may be electrically connected with a reception low noise amplifier (LNA) 321 and/or a transmission PA 322. A phase shifter 341 corresponding to H polarization may be electrically connected with the LNA 321 and/or the PA 322. Although not shown, it will be appreciated by one of ordinary skill in the art that a switch for switching between the LNA 321 and the PA 322 may be further included corresponding to the transmission and/or reception period, which may also be applied to the path corresponding to the V polarization and other antenna elements. The phase shifter 341 may be electrically connected, directly or indirectly, to a splitter/combiner 351 corresponding to H polarization. For example, the terminal V of the first antenna element 311 may be electrically connected with a reception LNA 323 and/or a transmission PA 342. A phase shifter 342 corresponding to V polarization may be electrically connected with the LNA 323 and/or the PA 324. The phase shifter 342 may be electrically connected, directly or indirectly, to a splitter/combiner 352 corresponding to V polarization. The relationship between the antenna element 312 and the amplifiers 325, 326, 327, and 328, the phase shifters 343 and 344 and the splitter/combiners 351 and 352, and the relationship between the antenna element 313 and the amplifiers 329, 330, 331, and 332, the phase shifters 345 and 346, and the splitter/combiners 351 and 352 are substantially the same, so that the description is not repeated.

According to an embodiment, upon transmission, the intermediate frequency signal IFH corresponding to H polarization may be mixed with the signal provided from the PLL 361 amplified by the amplifier 362, by the mixer 364. The mixer 364 may output an RF signal corresponding to H polarization having an RF frequency. Here, 'corresponding to H polarization' may indicate being associated with generation of an electromagnetic wave of a specific polarization by the antenna element. The mixer 364 may output an RF signal corresponding to H polarization having an RF frequency. The splitter/combiner 351 corresponding to H polarization may split the RF signal corresponding to H polarization for one transmission into N pieces, and provide them to the N phase shifters 341, 343, . . . , and 345, respectively. Here, the splitter/combiner 351 corresponding to H polarization is for an RF path of the signal corresponding to H polarization, and may be substantially the same as the splitter/combiner 352 corresponding to V polarization. However, in some cases, they may be different. For beamforming, the respective phase shifting degrees of the phase shifters 341, 343, . . . , and 345 may be determined. Each of the phase shifters 341, 343, . . . , and 345 may shift and output the phases of the RF signals corresponding to the input split H polarizations according to the determined phase shifting degrees. Accordingly, beamforming that directs the RS signal in an intended direction may be performed, and the rising effect of effective isotropic radiated power (EIRP) may be, e.g., 20*log N (where N is the number of antenna elements). The PAs 322, 326, . . . , and 330 may amplify the shifted RF signals and provide the amplified signals to the antenna elements 311, 312, . . . , and 313. Meanwhile, the RF signal corresponding to the V polarization is substantially identical in processing to the RF signal corresponding to H polarization, and the description is not repeated. Meanwhile, the PAs 322, 324, 326, 328, 330, and 332 maintain linearity when the magnitude of the input RF signal is a predetermined magnitude or less but may not maintain linearity when the magnitude of the input RF signal exceeds the predetermined magnitude (or gain may be compressed). To compensate for the compressed gain, DPD may be performed by a modem (not shown), which is described below.

According to an embodiment, upon reception, RF signals may be output from the respective terminals H and V of the antenna elements 311, 312, . . . , and 313. For example, an RF signal may be output from the H polarization terminal H of the first antenna element 311. The RF signal may be amplified by the LNA 321. For example, a switch (not shown) may control to allow the LNA 321 to connect to the first antenna element 311 while the PA 322 is not connected during a reception period. The phase shifter 341 may shift the phase of the amplified RF signal according to the control. The phases of the signals corresponding to H polarization may be shifted by the phase shifters 341, 343, and 345, so that beamforming on the reception side may be performed. The shifted signals may be combined by the splitter/combiner 351. For example, when there are relatively more and/or stronger ambient interference signals, the difference between the sum of the magnitudes of the RF signals before phase shift and the magnitude of the combined RF signal output from the splitter/combiner 351 may be relatively large. When there are relatively fewer and/or weaker ambient interference signals, the difference between the sum of the magnitudes of the RF signals before phase shift and the magnitude of the combined RF signal output from the splitter/combiner 351 may be relatively small. The combined RF signal may be provided to the mixer 364. The combined RF signal may be downconverted by the mixer 364. Accordingly, the intermediate frequency signal IFH corresponding to the H polarization may be output. Meanwhile, the operation for V polarization is substantially the same as that for H polarization, so that the description is not repeated.

Figure 3B:
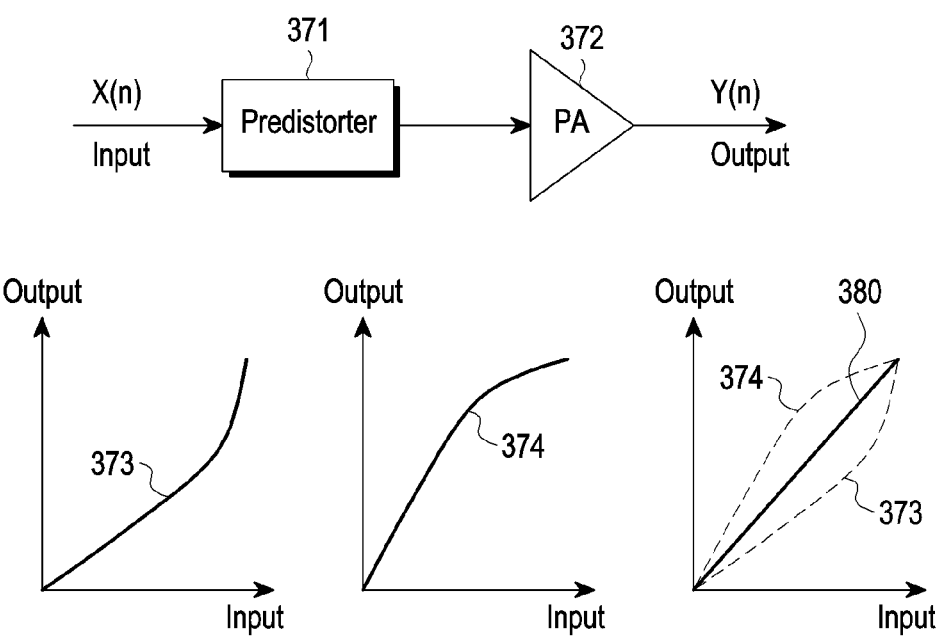
FIG. 3B is a view illustrating performing DPD according to an example embodiment.

FIG. 3B is a view illustrating performing DPD according to an embodiment.

According to an embodiment, an electronic device 101 may include a pre-distorter 371 configured to perform pre-distortion in the digital domain. The pre-distorter 371 may be included in, e.g., a model (or also referred to as a communication processor (at least one of the first communication processor 212, second communication processor 214, or integrated communication processor 260)), but it is exemplary, and it will be appreciated by one of ordinary skill in the art that the entity including the pre-distorter 371 and/or the position where the pre-distorter 371 is disposed is not limited. FIG. 3B illustrates the input/output characteristics 374 of the PA 372. Referring to the input/output characteristics 374 of the PA, it may be identified that the linearity of the input versus the output is maintained up to a predetermined magnitude of the input. However, it may be identified that the linearity of the input versus output is not maintained for inputs of the predetermined magnitude or larger. This may be due to physical limitations of the active elements (e.g., but not limited to transistors) of the PA 372.

Meanwhile, the pre-distorter 371 may receive the baseband signal X(n). The pre-distorter 371 may perform pre-distortion on the baseband signal X(n). For example, input/output characteristics 373 according to pre-distortion by the pre-distorter 371 are shown in FIG. 3B. Referring to the input/output characteristics 373 according to pre-distortion, the magnitude of the output may deviate from linearity for inputs having a specific magnitude or more. The pre-distorted signal may be converted into an RF signal (not shown), and the RF signal may be amplified by the PA 372. The input/output characteristics 380 for the amplified signal Y(n) may be identical to the result (or average or sum) of compensation for the input/output characteristics 373 according to pre-distortion and the input/output characteristics 374 by the PA 372. The input/output characteristics 380 for the amplified signal Y(n) may maintain input versus output linearity even for inputs of the specific magnitude or more.

Figure 3C:
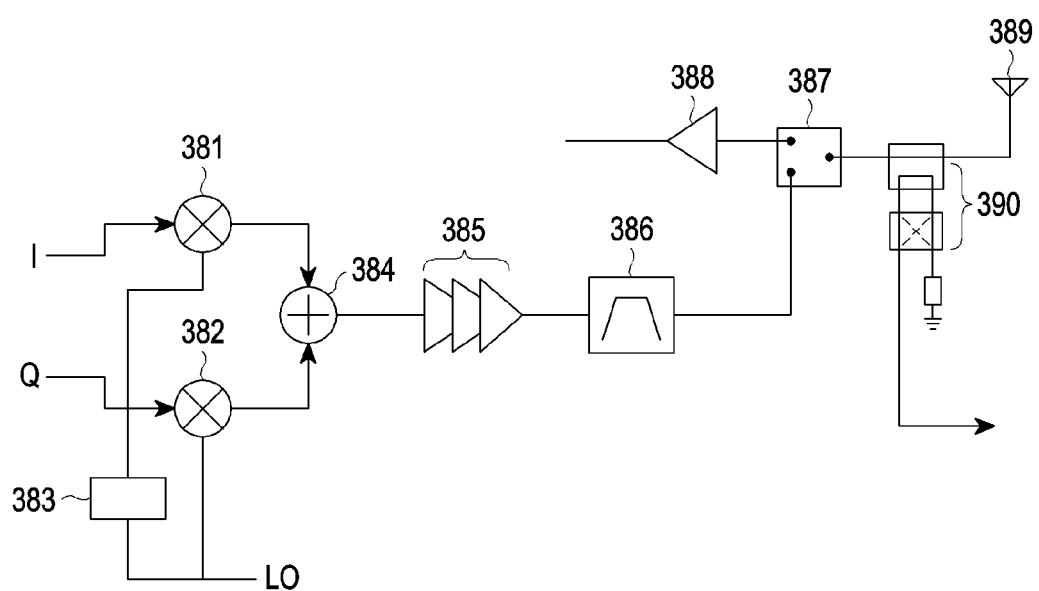
FIG. 3C is a view illustrating a process of processing an I/Q signal according to an example embodiment.
Figure 3D:
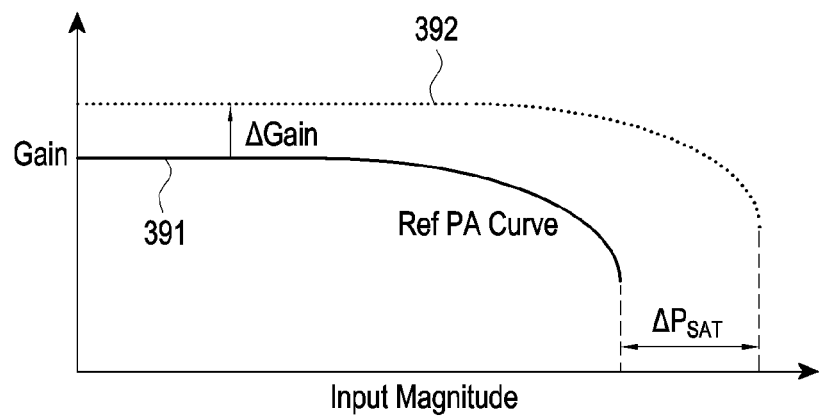
FIG. 3D is a view illustrating a change in PA curve according to an example embodiment.
Figure 3E:
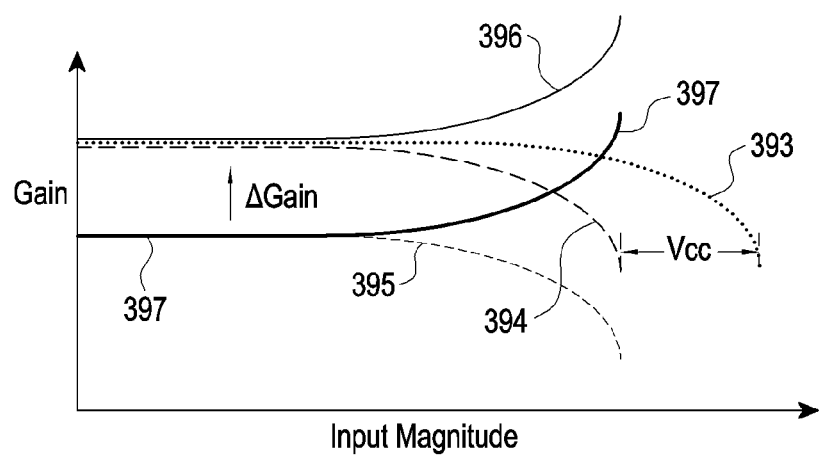
FIG. 3E is a view illustrating DPD characteristics corresponding to a changed PA curve and a reference PA curve according to an example embodiment.

FIG. 3C is a view illustrating a process of processing an I/Q signal according to an embodiment. The embodiment of FIG. 3C is described with reference to FIGS. 3D and 3E. FIG. 3D is a view illustrating a change in PA curve according to an embodiment. FIG. 3E is a view illustrating DPD characteristics corresponding to a changed PA curve and a reference PA curve according to an embodiment.

According to an embodiment, the signal of a local oscillator LO may be provided to the mixer 382 and the phase shifter 383. For example, the phase shifter 383 may shift the phase of the signal by 90 degrees and output it to the mixer 381. Accordingly, the Q signal may be mixed with the signal from the local oscillator LO by the mixer 382. The I signal may be mixed with the phase-shifted signal from the phase shifter 383. The mixed signals may be added by the adder 384. For convenience of description, it is shown and described that one step of mixing is performed but, according to an implementation, it will be appreciated by one of ordinary skill in the art that upconverting to an intermediate frequency signal and upconverting to an RF signal may also be performed. The addition-based RF signal may be amplified by at least one PA 385. At least some of the at least one PA 385 may be at least some of, e.g., the PAs 322, 324, 326, 328, 330, and 332 of FIG. 3A. The amplified signal may pass through the filter 386. The signal filtered by the filter 386 may be provided to the switch 387. For example, the switch 387 may electrically connect the filter 386 and the antenna 389 (e.g., at least one of the antenna elements 311, 312, . . . , and 313 of FIG. 3A) during the RF signal transmission period. The switch 387 may electrically connect the antenna 389 and the LNA 388 during the RF signal reception period. In an embodiment, a coupler 390 may be positioned on the path connected to the switch 387 and the antenna 389. The signal coupled by the coupler 389 may be converted, e.g., by an ADC (not shown), and a digital value may be provided to a modem (not shown). Accordingly, the modem (not shown) may identify the strength of the transmitted RF signal and/or the strength of the received RF signal.

For example, FIG. 3D illustrates a reference PA curve 391 of gain versus input. Referring to the reference PA curve 391, it may be identified that the gain maintains a constant value until the input magnitude reaches a specific magnitude. It may be identified that the gain decreases when the input magnitude exceeds the specific magnitude. The reference PA curve 391 may be identified based on the characteristics of at least one PA 385. However, for various reasons, the PA curve associated with the input/output may be changed from the reference PA curve 391 to a PA curve 392. For example, the PA curve may be changed by a characteristic variation (e.g., IV characteristic variation of a transistor, characteristic variation of a passive device, such as an inductor and/or capacitor) by at least one PA 385. For example, the PA curve may be changed according to a change in impedance of a filter 386 connected, directly or indirectly, to at least one PA 385. For example, the PA curve may be changed according to a change in impedance (e.g., load impedance but not limited) of the antenna 389 connected to at least one PA 385. For example, the PA curve 392 may be one shifted by $\Delta P_{SAT}$ in the x-axis direction and shifted by $\Delta Gain$ in the y-axis direction from the reference PA curve 391.

Referring to FIG. 3E, the first PA curve 393 changed from the reference PA curve 395 according to various causes may be changed into the second PA curve 394 by adjusting Vcc applied to at least one PA 385. Further, the second PA curve 394 may be changed into the reference PA curve 395 according to a change in the gain of the DPD signal. For example, the DPD curve 397 corresponding to the reference PA curve 395 and the DPD curve 396 corresponding to the second PA curve 394 may be performed for DPD. The DPD curve 396 may have a difference from the reference DPD curve 397 by $\Delta Gain$.

Figure 4A:
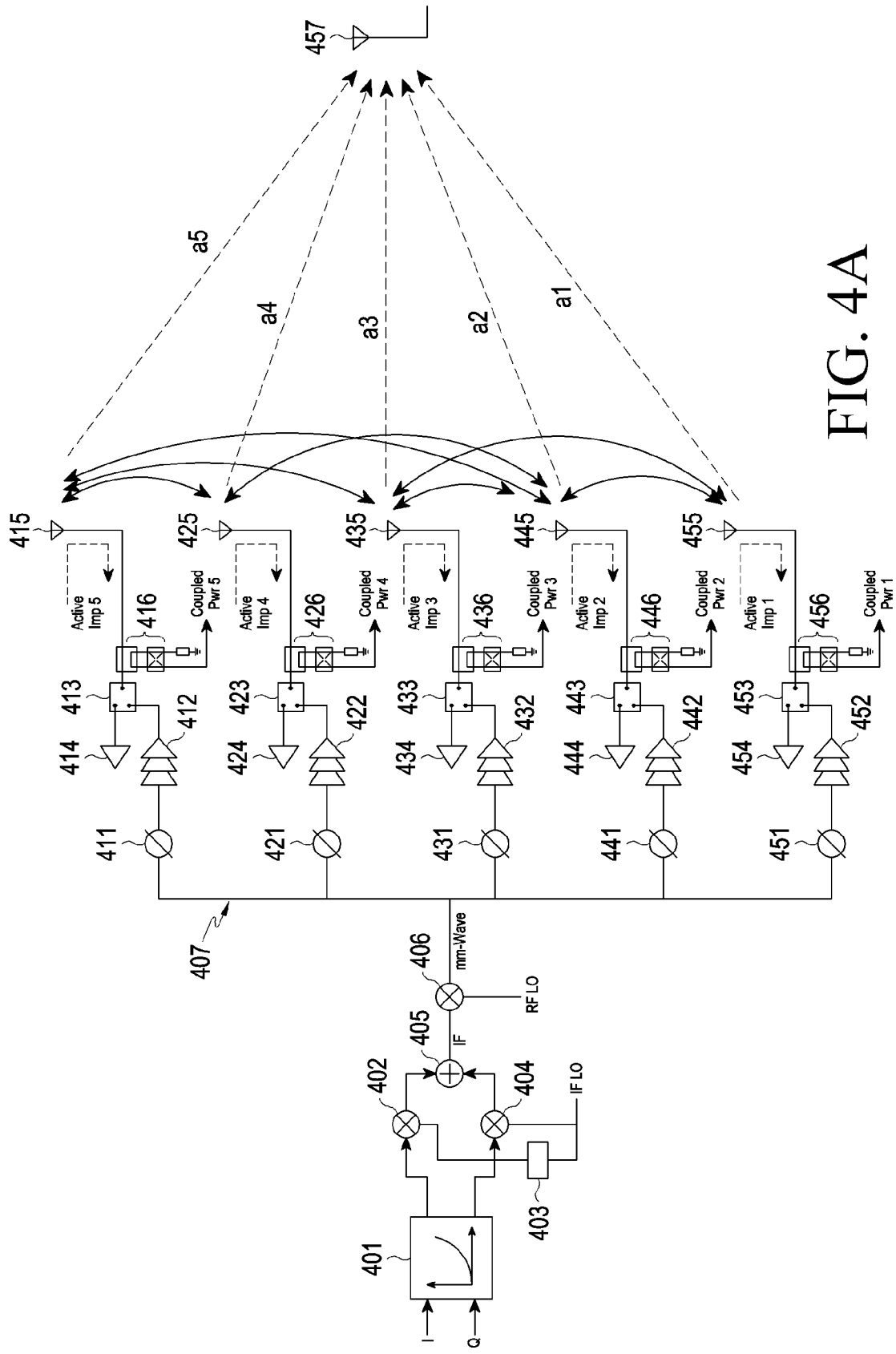
FIG. 4A is a view illustrating a coupling in a plurality of antenna elements included in an antenna array according to a comparative example for comparison with an example embodiment.
Figure 4B:
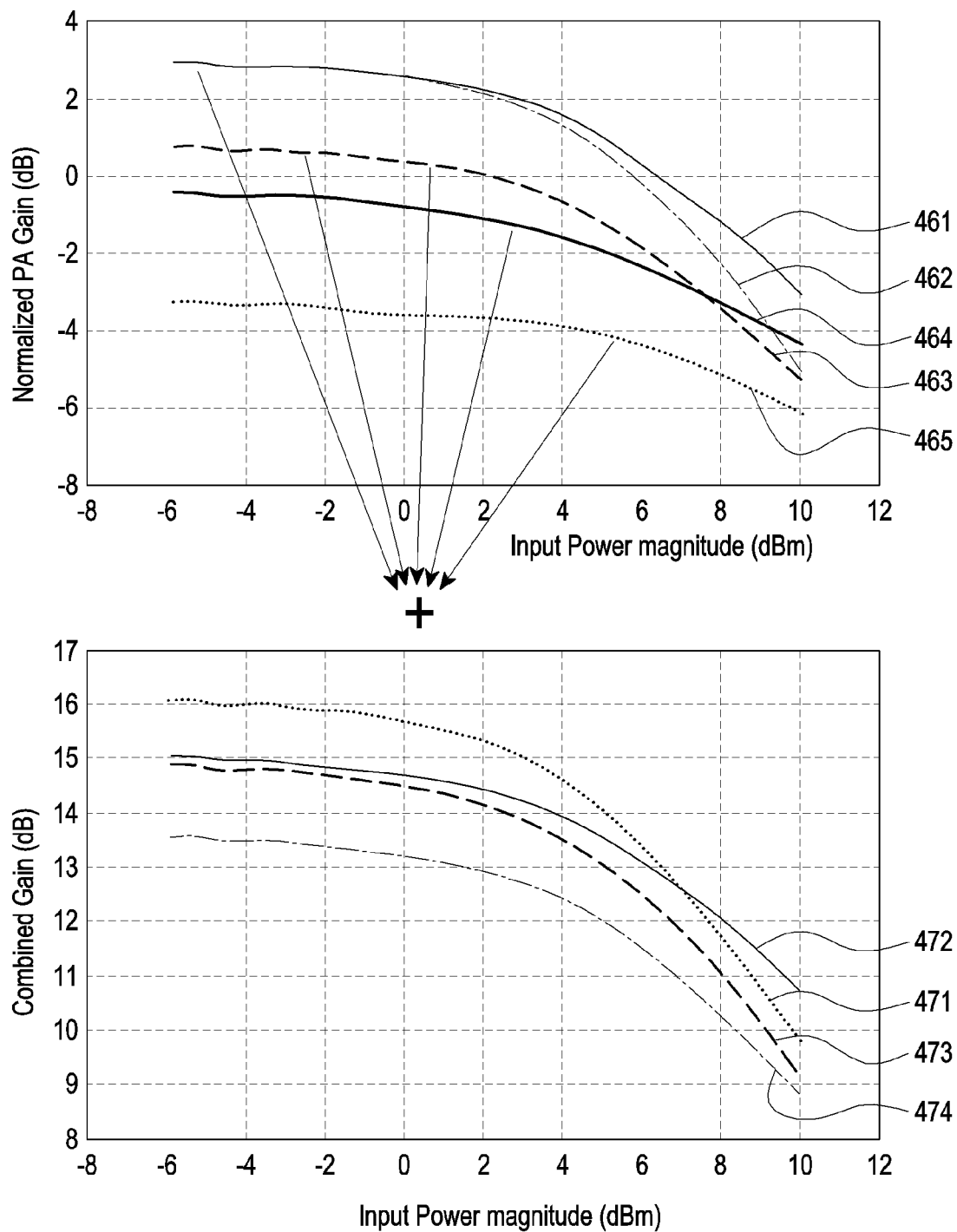
FIG. 4B is a view illustrating various weighted sums of gain characteristics per antenna element.

FIG. 4A is a view illustrating a coupling in a plurality of antenna elements included in an antenna array according to a comparative example for comparison with an embodiment. The embodiment of FIG. 4A is described with reference to FIG. 4B. FIG. 4B is a view illustrating various weighted sums of input/output characteristics per antenna element. Meanwhile, it will be appreciated by one of ordinary skill in the art that the relationship in connection between the entities of the electronic device and/or operations of the entities according to the comparative example may also be applied to various example embodiments.

Referring to FIG. 4A, a pre-distorter 401 may perform pre-distortion on each I/Q signal. The intermediate frequency local oscillator IF LO may output a signal for upconverting into an intermediate frequency signal. The phase of the signal for upconverting may be shifted by the phase shifter 403 and provided to the mixer 402. The mixer 402 may mix and output the distorted I signal and the phase-shifted signal. The mixer 404 may mix and output the distorted Q signal and the signal for upconverting. Both the signals may be added by the adder 405, so that an intermediate frequency signal IF may be generated. The RF local oscillator RF LO may output a signal for upconverting into an RF signal. The mixer 406 may generate, e.g., a mmWave RF signal (mmWave) by mixing the signal for upconverting and the intermediate frequency signal IF.

The RF signal (mmWave) may be divided into 5 sub RF signals by, e.g., a 1:5 splitter/combiner 407. For example, at least one of the phase shifter 411, at least one PA 412, the switch 413, and the LNA 414 (or may further include additional entities) may be referred to as an RF chain. The RF chain may include hardware for transmission and/or hardware for reception. For example, in the embodiment of FIG. 4A, five RF chains are shown, but there is no limit to the number of RF chains. In FIG. 4A, the LNAs 414, 424, 434, 444, and 454 are shown as not connected, but this is for convenience of description, it will be appreciated by one of ordinary skill in the art that they may be connected, directly or indirectly, to the splitter/combiner 407. Meanwhile, operations of the phase shifter 411, at least one PA 412, the switch 413, and the LNA 414 have been described with reference to FIG. 3C, so that the description is not repeated below. A coupler 416 may be connected, directly or indirectly, to the switch 413. Coupled power Pwr 5 may be identified for identifying the magnitude of the strength of the transmitted RF signal provided to the antenna 415 and/or the strength of the received RF signal provided through the antenna 415, through the coupler 416. Meanwhile, the description of the RF chain for the phase shifters 421, 431, 441, and 451, PAs 422, 432, 442, and 452, switches 423, 433, 443, and 453, LNAs 424, 434, 444, and 454, antennas 425, 435, 445, and 455, or couplers 426, 436, 446, and 456 is not repeated.

By controlling the phase shifters 411, 421, 431, 441, and 451, RF signals from the respective antennas 415, 425, 435, 445, and 455 may be beamformed (e.g., constructive interference) to the point of the antenna 457 of the reception device. However, RF signals from the antennas 415, 425, 435, 445, and 455, respectively, may interfere with each other. Accordingly, the impedance viewed from each of the PAs 412, 422, 432, 442, and 452 (e.g., also referred to as the impedance of the antennas 415, 425, 435, 445, and 455) may be changed to differ. Although the PAs 412, 422, 432, 442, and 452 have the same design and/or the same settings, the PAs 412, 422, 432, 442, and 452 may all have different gain characteristics according to the operation state (e.g., frequency, beam steering setting of the antenna array, and/or surrounding environment). For example, FIG. 4B shows PA curves 461, 462, 463, 464, and 465 according to different gain characteristics for the PA 412, 422, 432, 442, and 452. When the outputs of the PAs 412, 422, 432, 442, and 452 having different gain characteristics overlap at the target point (e.g., the point of the antenna 457 in FIG. 4A), the summated PA curve may differ depending on the signal transfer coefficient (or referred to as a weight) (a1, a2, a3, a4, and a5) from each antenna 415, 425, 435, 445, and 455 to the target point. The signal transfer coefficient may be related to, e.g., the efficiency and/or pattern of the antennas 415, 425, 435, 445, and 455, but is not limited thereto. For example, FIG. 4B illustrates summated PA curves 471, 472, 473, and 474 for various combinations (e.g., four combinations) of signal transfer coefficients a1, a2, a3, a4, and a5. As described above, the gain characteristics of the PAs 412, 422, 432, 442, and 452 for processing, e.g., mmWave RF signals may be changed depending on the operation state of the electronic device 101 (e.g., frequency, beam steering, whether a cover is attached to the electronic device 101, and/or whether there is an object blocking the line of sight (LOS) of the electronic device 101). The operation state of the electronic device 101 may affect the signal transfer coefficient to the reception antenna from the RF chain corresponding to the PA, as well as the PA gain characteristics. Further, a change in signal transfer coefficient may cause a change in the linear characteristics of the signals combined, received by the reception-side electronic device. For example, the gain characteristics of the PAs 412, 422, 432, 442, and 452 for mmWave RF signal processing may be varied depending on the signal transfer coefficients from the antennas 415, 425, 435, 445, and 455 to the target point. Meanwhile, it may be limited to receive feedback of the coupled signal for each antenna element based on the structure of the RF circuit supporting mmWave to analyze the I/Q signal. The front end for mmWave communication may be present in the form of an AiP where the antenna module and the antenna are integrated, and there may be a limit to the number of lines for connecting (or interfacing) the AiP module to the IFIC or modem on the PCB. It may burden the design to increase new lines for transferring the feedback signal for monitoring the transmitted RF signal to the IFIC or modem. According to an embodiment, the mmWave antenna module may include couplers 416, 426, 436, 446, and 456 for measuring the magnitude of the RF signal for each RF chain and a power detector (not shown). The magnitude of the power measured by the power detector may be converted into a digital value, and the digital value may be provided to the modem through a serial interface. According to various example embodiments, as described in connection with FIG. 5A, it is possible to determine the parameters (e.g., signal transfer coefficient, per-PA gains, and/or $P_{SAT}$) for modeling non-linear characteristics and/or the effectiveness based on the coupler and coupled signals for measuring the magnitude of RF signals before split and/or RF signals simply combined even without adopting an additional line, and this is described below. $P_{SAT}$ may also be referred to as saturated output power.

Figure 5A:
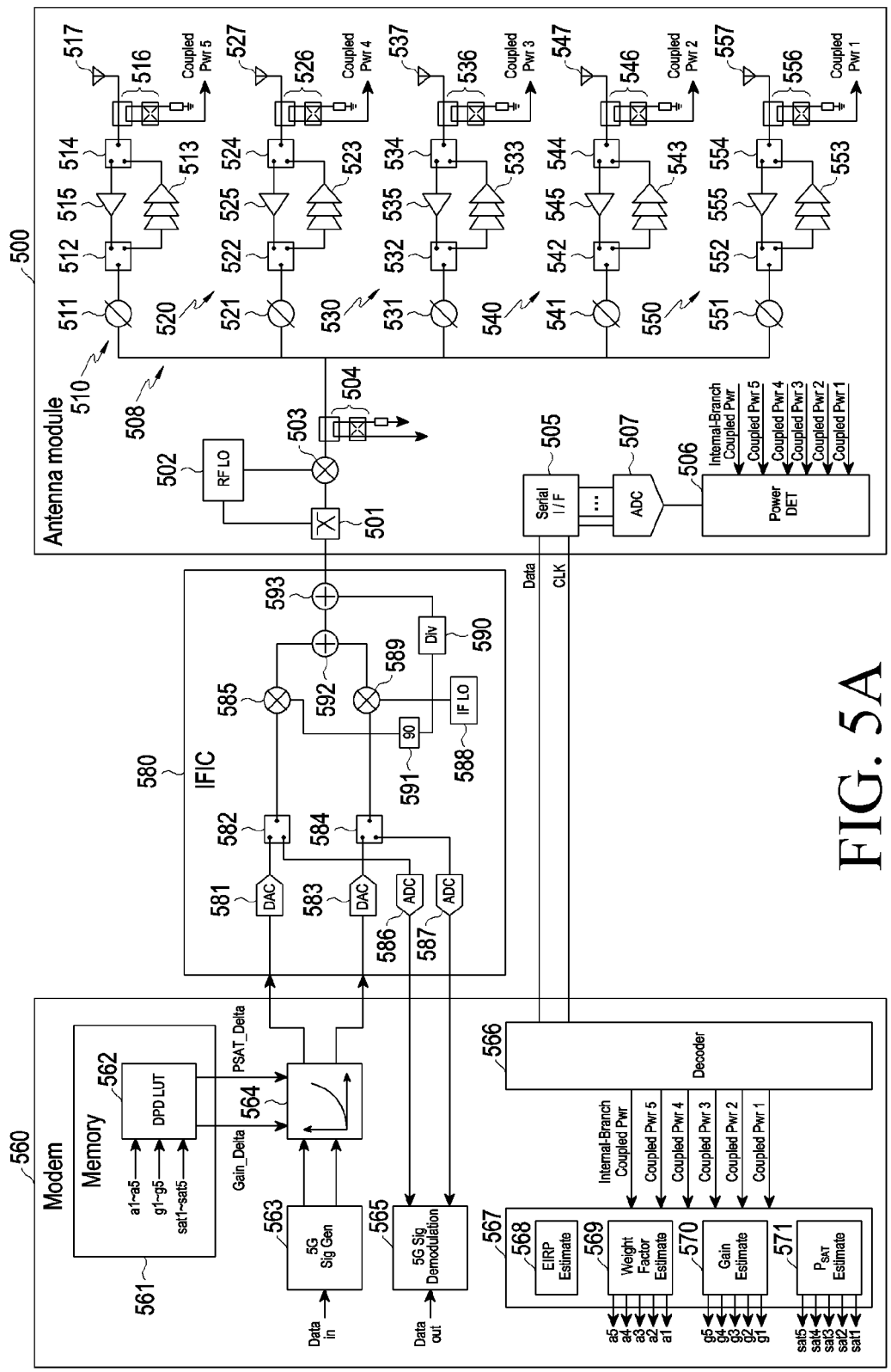
FIG. 5A is a view illustrating a modem, an intermediate frequency IC (IFIC), and an mmWave antenna module according to an example embodiment.

FIG. 5A is a view illustrating a modem, an intermediate frequency IC (IFIC), and an mmWave antenna module according to an embodiment.

Referring to FIG. 5A, according to an embodiment, an electronic device 101 may include an antenna module 500, a modem 560, and an intermediate frequency IC (IFIC) 580. The modem 560 (e.g., at least one of the processor 120, the communication module 190, wireless communication module 192, the first communication processor 212, the second communication processor 214, or the integrated communication processor 260) may provide a baseband signal. The modem 560 may perform pre-distortion and provide a distorted baseband signal. The intermediate frequency IC 580 may upconvert the distorted baseband signal and output an intermediate frequency signal. The antenna module 500 may provide sub RF signals from the plurality of antennas 517, 527, 537, 547, and 557 based on the intermediate frequency signal. The phase of each sub RF signal may be adjusted for beamforming. Here, the sub RF signal may indicate the RF signal transmitted to each of the RF chains 510, 520, 530, 540, and 550 after split by the combiner/splitter 508 and/or the received RF signal applied to each of the RF chains 510, 520, 530, 540, and 550 before combined by the combiner/splitter 508.

According to an embodiment, the antenna module 500 may include a filter 501, an RF local oscillator (RF LO) 502, a mixer 503, an internal-branch coupler 504, a serial interface (serial I/F) 505, an ADC 507, a power detector (power DET) 506, a combiner/splitter 508, phase shifters 511, 521, 531, 541, and 551, switches 512, 522, 532, 542, 552, 514, 524, 534, 544, and 554, PAs 513, 523, 533, 543, and 553, LNAs 515, 525, 535, 545, and 555, couplers 516, 526, 536, 546, and 556, and/or antennas 517, 527, 537, 547, and 557. The filter 501 may be, e.g., a diplexer. When the intermediate frequency signal and the reference clock ref clk are received from the intermediate frequency IC 580 in a state in which they are added, the filter 501 may branch the reference clock ref clk and the intermediate frequency signal. The branched intermediate frequency signal may be provided to the mixer 503. The reference clock ref clk may be provided to the RF local oscillator. It will be appreciated by one of ordinary skill in the art that the description of the corresponding entities in FIG. 4A may also be applied to the combiner/splitter 508, phase shifters 511, 521, 531, 541, and 551, switches 512, 522, 532, 542, 552, 514, 524, 534, 544, and 554, PAs 513, 523, 533, 543, and 553, LNAs 515, 525, 535, 545, and 555, couplers 516, 526, 536, 546, and 556, and/or antennas 517, 527, 537, 547, and 557 in FIG. 5A.

According to an embodiment, when an uplink signal is transmitted, the intermediate frequency signal provided from the intermediate frequency IC 580 may be filtered by the filter 501. The filtered intermediate frequency signal may be mixed with the signal for upconverting from the RF local oscillator 502 by the mixer 503 so that a transmitted RF signal may be provided. The transmitted RF signal may be split into N (e.g., 5, but not limited to) transmitted sub RF signals by the combiner/splitter 508 and provided to the RF chains 510, 520, 530, 540, and 550, respectively. The internal branch coupler 504 may provide internal-branch coupled power Pwr capable of determining the magnitude of the transmitted RF signal before split into the transmitted sub RF signals. According to an embodiment, when a downlink signal is received, the sub RF signals received from the RF chains 510, 520, 530, 540, and 550 may be combined by the combiner/splitter 508, and a received RF signal may be provided. For convenience of description, the RF signal in which the sub RF signals received from the RF chains 510, 520, 530, 540, and 550 are combined may be referred to as a received RF signal. The internal branch coupler 504 may provide internal-branch coupled power Pwr capable of determining the magnitude of the received RF signal provided from the combiner/splitter 508.

According to an embodiment, the power detector 506 may provide the ADC 507 with an analog signal associated with the magnitude of the internal-branch coupled power Pwr provided from the internal branch coupler 504. The position of the internal branch coupler 504 is not limited, and various positions are described below. The ADC 507 may convert the analog signal into a digital value. The serial interface 505 may provide the converted digital value to the modem 560. The power detector 506 may receive coupled powers Coupled Pwr 1, Coupled Pwr 2, Coupled Pwr 3, Coupled Pwr 4, and Coupled Pwr 5 respectively corresponding to the RF chains 510, 520, 530, 540, and 550. When the uplink signal is transmitted, each of the coupled powers Coupled Pwr 1, Coupled Pwr 2, Coupled Pwr 3, Coupled Pwr 4, and Coupled Pwr 5 may be used to identify the magnitude of each of the sub RF signals transmitted to the antennas 517, 527, 537, 547, and 557, respectively. Here, the magnitude of the sub RF signal may indicate the magnitude of the power of the sub RF signal, but there is no limitation on the unit of the magnitude. When the downlink signal is received, each of the coupled powers Coupled Pwr 1, Coupled Pwr 2, Coupled Pwr 3, Coupled Pwr 4, or Coupled Pwr 5 may be used to identify the magnitude of each of the received sub RF signals provided from the antennas 517, 527, 537, 547, and 557, respectively. Meanwhile, although it has been described in connection with FIG. 5A that the internal-branch coupled power Pwr and coupled powers Coupled Pwr 1, Coupled Pwr 2, Coupled Pwr 3, Coupled Pwr 4, or Coupled Pwr 5 are provided to the modem 560 through serial communication via the serial interface 505 which comprises interface circuitry, it will be appreciated by one of ordinary skill in the art that it is exemplary, and the type of the interface is not limited. Further, although it has been described in connection with FIG. 5A that the internal-branch coupled power Pwr and coupled powers Coupled Pwr 1, Coupled Pwr 2, Coupled Pwr 3, Coupled Pwr 4, or Coupled Pwr 5 are transmitted, and are received and processed by the modem 560, it will be appreciated by one of ordinary skill in the art that it is for convenience of description, and the digital values of the internal-branch coupled power Pwr and coupled powers Coupled Pwr 1, Coupled Pwr 2, Coupled Pwr 3, Coupled Pwr 4, or Coupled Pwr 5 are provided through the interface.

According to an embodiment, the modem 560 may include a memory 561, a 5G signal modulation module (5G sig gen) 563, a pre-distorter 564, a 5G signal demodulation module (5G sig demodulation) 565, a decoder 566, and/or an estimation module 567. The decoder 566 may decode the information provided from the serial interface 505. Accordingly, the digital values of the internal-branch coupled power Pwr and coupled powers Coupled Pwr 1, Coupled Pwr 2, Coupled Pwr 3, Coupled Pwr 4, or Coupled Pwr 5 may be provided to the estimation module 567.

According to an embodiment, the estimation module 567 may include an EIRP estimation module (EIRP estimate) 568, a weight estimation module (weight factor estimate) 569, a gain estimation module (gain estimate) 570, and/or a $P_{SAT}$ estimation module (PSAT estimate) 571. At least a portion of the estimation module 567 and the pre-distorter 564 may be implemented as at least one processor. The EIRP estimation module (EIRP estimate) 568 may estimate the EIRP based on the provided values. The weight estimation module 569 may identify the weights a1, a2, a3, a4, and a5 and/or whether the weights a1, a2, a3, a4, and a5 are effective for each RF chain (or for each of the PAs 513, 523, 533, 543, and 553 or each of the antennas 517, 527, 537, 547, and 557) based on the provided values corresponding to the downlink signal, and the detailed identification process is described below. The gain estimation module 570 may identify the gains g1, g2, g3, g4, and g5 and/or whether the gains g1, g2, g3, g4, and g5 are effective for each RF chain (or for each of the PAs 513, 523, 533, 543, and 553 or for each of the antennas 517, 527, 537, 547, and 557) based on the provided values corresponding to the uplink signal, and the detailed identification process is described below. The $P_{SAT}$ estimation module 571 may identify the $P_{SAT}$ sat1, sat2, sat3, sat4, and sat5 and/or whether the $P_{SAT}$ sat1, sat2, sat3, sat4, and sat5 are effective for each RF chain (or for each of the PAs 513, 523, 533, 543, and 553 or for each of the antennas 517, 527, 537, 547, and 557) based on the provided values corresponding to the uplink signal, and the detailed identification process is described below.

According to an embodiment, the 5G modulation module 563 may modulate the input data and provide a baseband signal (e.g., I/Q signal). The pre-distorter 564 may perform pre-distortion on the baseband signal by referring to a reference DPD lookup table (LUT) 562 stored in the memory 561. In an embodiment, the memory 561 may store an instruction to cause at least some of the operations performed by the modem 560 to be performed by the modem 560. The instruction may be executed by the processor (e.g., the estimation module 567 and/or the pre-distorter 564) of the modem 560. For example, the pre-distorter 564 may identify the gain difference gain_delta and/or $P_{SAT}$ difference PSAT_delta based on the weights a1, a2, a3, a4, and a5, the gains g1, g2, g3, g4, and g5, and/or the $P_{SAT}$ sat1, sat2, sat3, sat4, and sat5 provided from the estimation module 567. The pre-distorter 564 may refer to the reference DPD lookup table 562 (e.g., change the point for reference) based on the gain difference gain_delta and/or the $P_{SAT}$ difference PSAT_delta. In one example, the pre-distorter 564 may identify a first gain for DPD by referring to the reference DPD lookup table 562 based on the $P_{SAT}$ difference PSAT_delta and identify the final gain for DPD by applying (e.g., adding) the gain difference gain_delta to the first gain. The pre-distorter 564 may perform DPD on the baseband signal based on the final gain for DPD. The pre-distorter 564 may provide the distorted baseband signal (e.g., I/Q signal) to the intermediate frequency IC 580. According to an embodiment, the intermediate frequency IC 580 may convert the received baseband signal into an analog signal and/or provide an intermediate frequency signal. The intermediate frequency IC 580 may include DACs 581 and 583 for conversion into the analog signal, switches 582 and 584 for switching transmission/reception paths, an IF local oscillator 588 providing a signal for upconverting into an intermediate frequency signal, a splitter 590 a phase shifter 591, mixers 585 and 589, adders 592 and 593, and/or ADCs 586 and 587 converting the received analog intermediate frequency signal into a digital value, but is not limited. The splitter 590 may generate a reference clock ref clk to be used by the RF local oscillator (RF LO) 502 of the antenna module 500 by frequency-dividing the IF LO signal with a frequency divider circuit. The adder 593 may add the corresponding reference clock ref clk to the intermediate frequency signal for line savings and provide it to the antenna module 500. As described above, the filter 501 may branch the intermediate frequency signal and the reference clock ref clk.

Figure 5B:
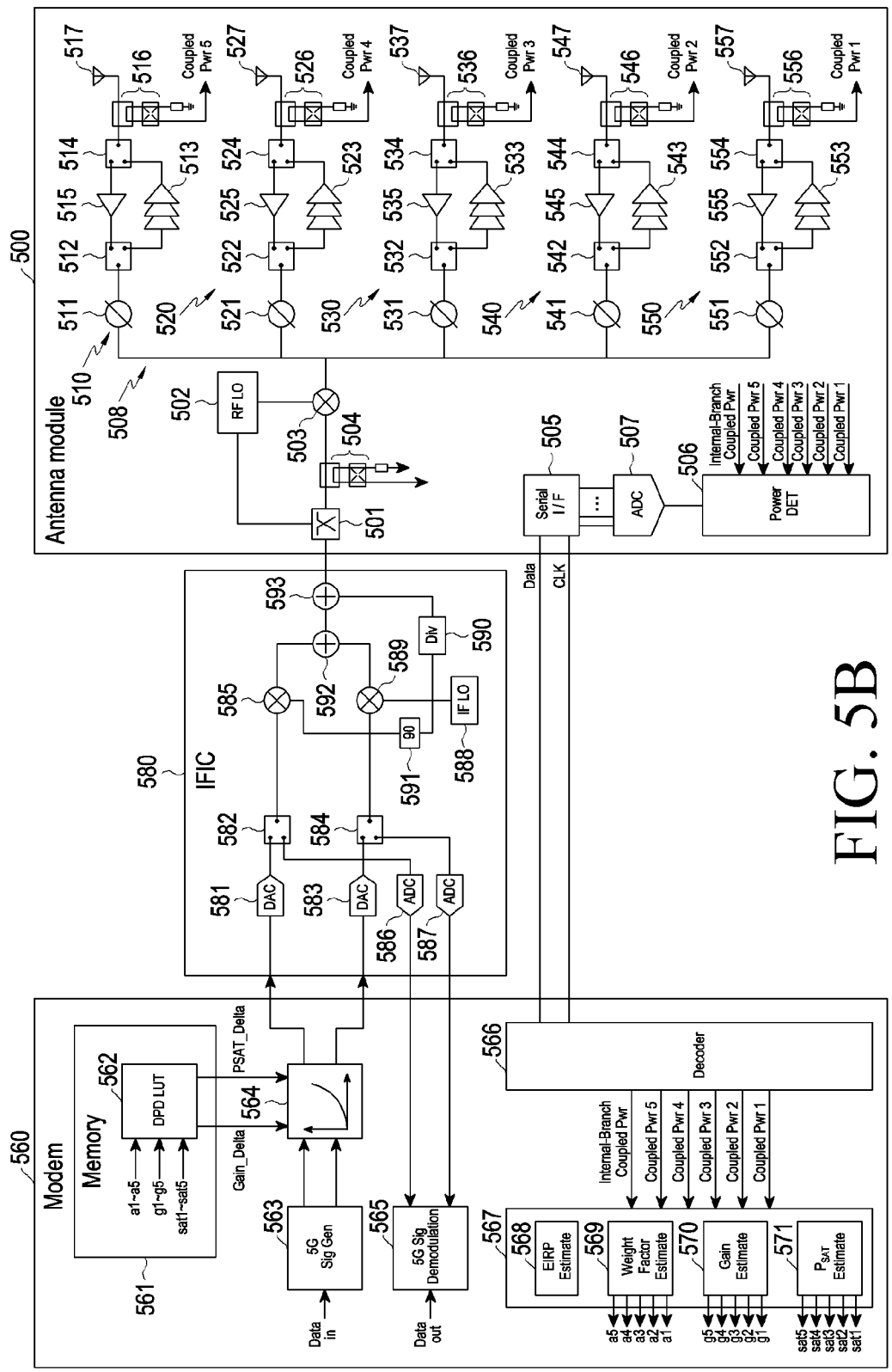
FIG. 5B is a view illustrating a modem, an intermediate frequency IC (IFIC), and an mmWave antenna module according to an embodiment.

FIG. 5B is a view illustrating a modem, an intermediate frequency IC, and an mmWave antenna module according to an embodiment.

According to an embodiment, an inner branch coupler 504 may be connected, directly or indirectly, between the filter 501 and the mixer 503. Accordingly, when transmitting an uplink signal, the internal branch coupler 504 may provide a coupling signal for identifying the magnitude of the transmitted intermediate frequency signal. The magnitude of the transmitted intermediate frequency signal may correspond to the magnitude of the transmitted RF signal. Accordingly, various parameters associated with the magnitude of the transmitted RF signal may be identified based on the magnitude of the transmitted intermediate frequency signal. When receiving a downlink signal, the internal branch coupler 504 may provide a coupling signal to identify the magnitude of the intermediate frequency signal in which the received RF signal is downconverted. The magnitude of the intermediate frequency signal may correspond to the magnitude of the received RF signal. Accordingly, various parameters associated with the magnitude of the received RF signal may be identified based on the magnitude of the intermediate frequency signal.

Figure 5C:
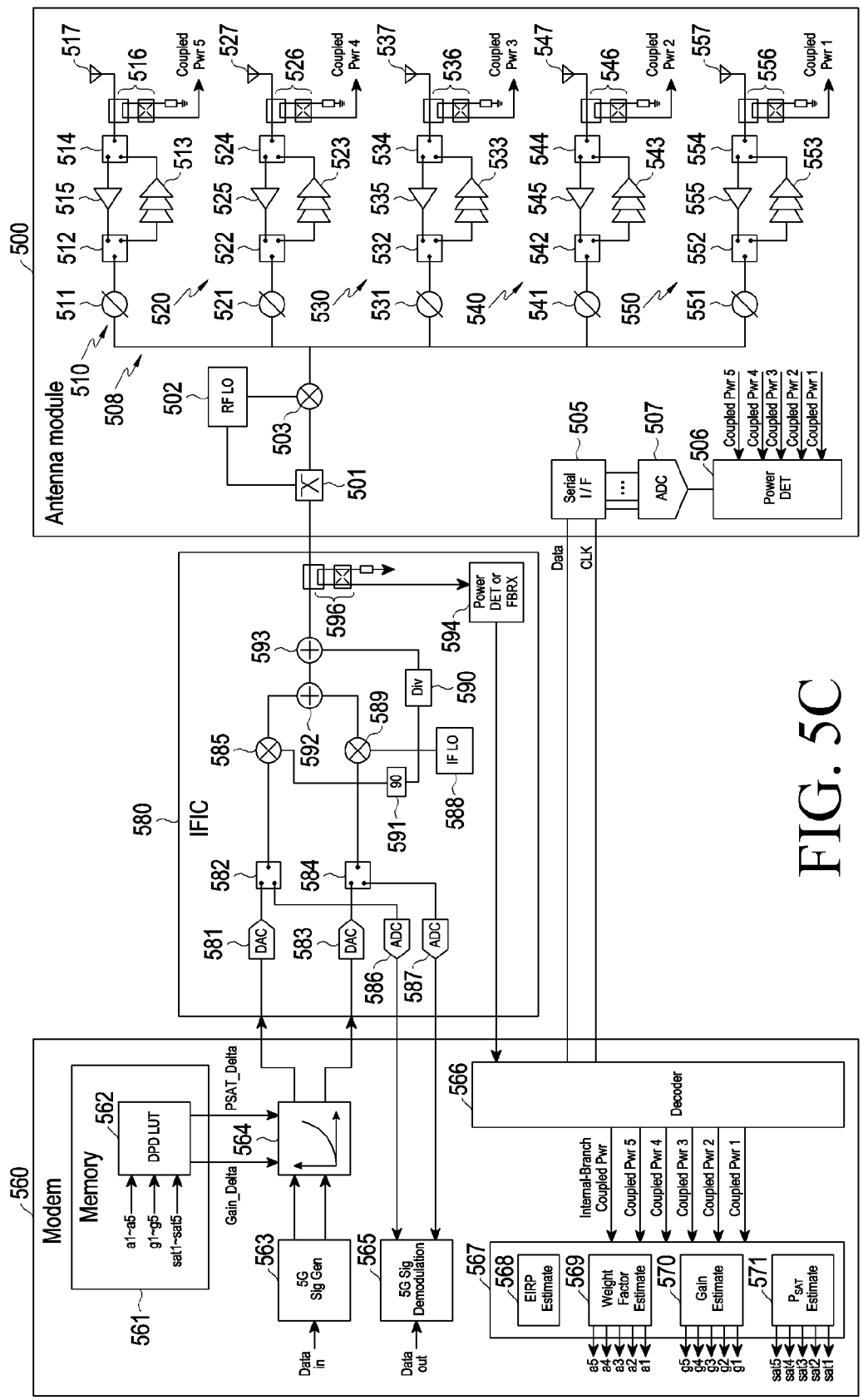
FIG. 5C is a view illustrating a modem, an intermediate frequency IC (IFIC), and an mmWave antenna module according to an example embodiment.

FIG. 5C is a view illustrating a modem, an intermediate frequency IC (IFIC), and an mmWave antenna module according to an embodiment.

According to an embodiment, the internal branch coupler 596 may be included in the IFIC 580. Accordingly, when transmitting an uplink signal, the internal branch coupler 596 may provide a coupling signal for identifying the magnitude of the transmitted intermediate frequency signal. In an embodiment, the IFIC 580 may include a power detector (or feedback reception circuit (FBRX)) 594. The coupling signal output from the internal branch coupler 596 may be provided to the power detector (or a feedback reception circuit) 594. The power detector (or feedback reception circuit) 594 may provide the magnitude of the coupling signal to the modem 560. The magnitude of the transmitted intermediate frequency signal may correspond to the magnitude of the transmitted RF signal. Accordingly, various parameters associated with the magnitude of the transmitted RF signal may be identified based on the magnitude of the transmitted intermediate frequency signal. When receiving a downlink signal, the internal branch coupler 596 may provide a coupling signal to identify the magnitude of the received intermediate frequency signal. The magnitude of the received intermediate frequency signal may correspond to the magnitude of the received RF signal. Accordingly, various parameters associated with the magnitude of the received RF signal may be identified based on the magnitude of the received intermediate frequency signal.

Figure 5D:
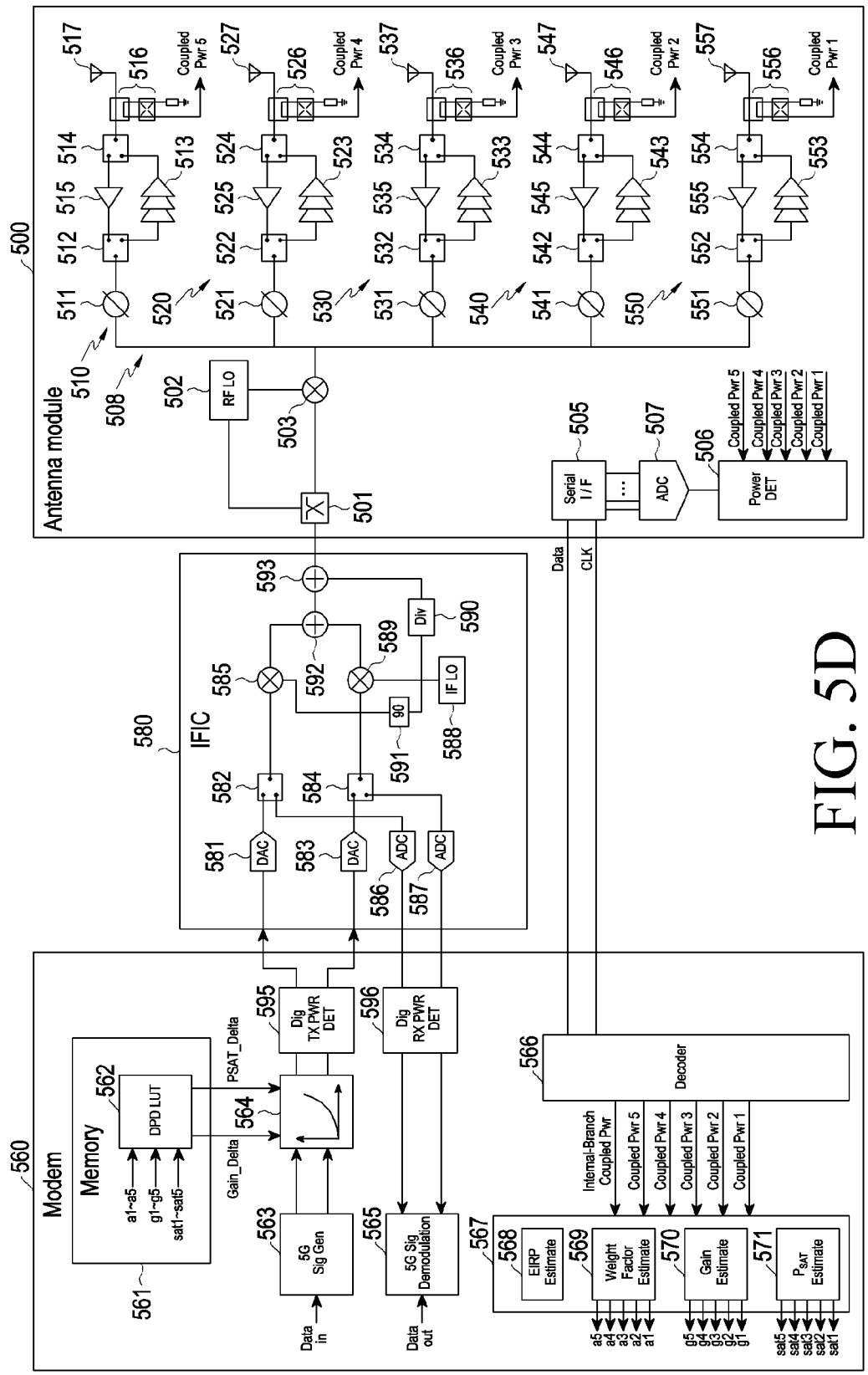
FIG. 5D is a view illustrating a modem, an intermediate frequency IC (IFIC), and an mmWave antenna module according to an example embodiment.

FIG. 5D is a view illustrating a modem, an intermediate frequency IC, and an mmWave antenna module according to an embodiment.

According to an embodiment, the modem 560 may include a digital transmission power detector 595 and/or a digital reception power detector 596. When the uplink signal is transmitted, the digital transmission power detector 595 may detect the magnitude of the transmitted baseband signal. The magnitude of the transmitted baseband signal may correspond to the magnitude of the transmitted RF signal. Accordingly, various parameters associated with the magnitude of the transmitted RF signal may be identified based on the magnitude of the transmitted baseband signal. Upon reception of the downlink signal, the digital reception power detector 596 may detect the magnitude of the received baseband signal. The magnitude of the received baseband signal may correspond to the magnitude of the received RF signal. Accordingly, various parameters associated with the magnitude of the received RF signal may be identified based on the magnitude of the received baseband signal.

Figure 5E:
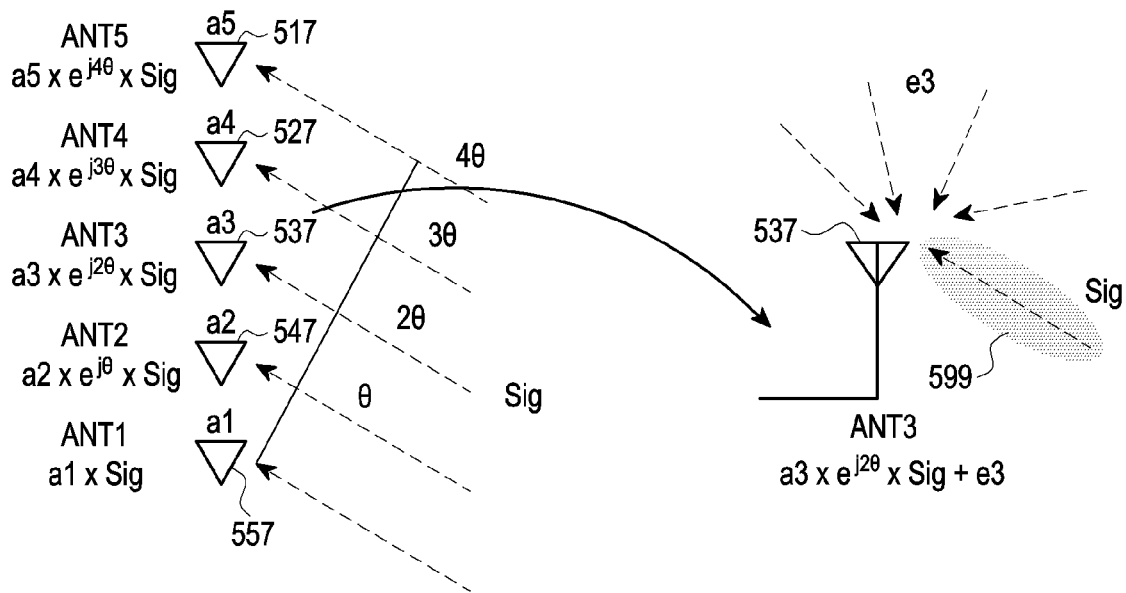
FIG. 5E is a view illustrating a case where a downlink signal is received according to an example embodiment.

FIG. 5E is a view illustrating a case where a downlink signal is received according to an embodiment.

According to an embodiment, when the downlink signal 599 is received, the received RF signals induced (or generated) at the antennas 517, 527, 537, 547, and 557 may have different magnitudes. Each of the received RF signals induced by the respective antennas 517, 527, 537, 547, and 557 by the downlink signal 599 may have a phase difference. For example, a phase difference between adjacent antennas may be referred to as θ. Accordingly, the received RF signals induced by the respective antennas 517, 527, 537, 547, and 557 may be represented as shown in Table 1.

TABLE 1

| antenna 517 | a5 X $e^{j4\theta}$ X Sig |
|---|---|
| antenna 527 | a4 X $e^{j3\theta}$ X Sig |
| antenna 537 | a3 X $e^{j2\theta}$ X Sig |
| antenna 547 | a2 X $e^{j\theta}$ X Sig |
| antenna 557 | a1 X Sig | a1 to a5 are the above-described signal transfer coefficients and, as described above, may be referred to as weights. Meanwhile, there may be an influence by interference signals e3.

If, in the situation shown in FIG. 5E, there is no other signal (e.g., e3) other than the downlink signal 599 or if its magnitude is relatively small, the magnitudes of the RF signals induced at the antennas 517, 527, 537, 547, and 557 may be associated with a ratio of the strengths measured by the corresponding couplers 516, 526, 536, 546, and 556. In this case, the signal transfer coefficient (or weight) may be determined as shown in Table 2.

TABLE 2

| | |
|---|---|
| a1 | RX Coupled Pwr 1/RX Coupled Pwr 1 = 1 |
| a2 | RX Coupled Pwr 2/RX Coupled Pwr 1 |
| a3 | RX Coupled Pwr 3/RX Coupled Pwr 1 |
| a4 | RX Coupled Pwr 4/RX Coupled Pwr 1 |
| a5 | RX Coupled Pwr 5/RX Coupled Pwr 1 |

However, although Table 2 may be effective in an experimental environment, when the influence of the interference signals e3 is relatively large, its effectiveness may be difficult to ensure. Accordingly, it may be required to determine whether the signal transfer coefficient (or weight) is effective, which is described with reference to FIGS. 6A and 6B.

Figure 6A:
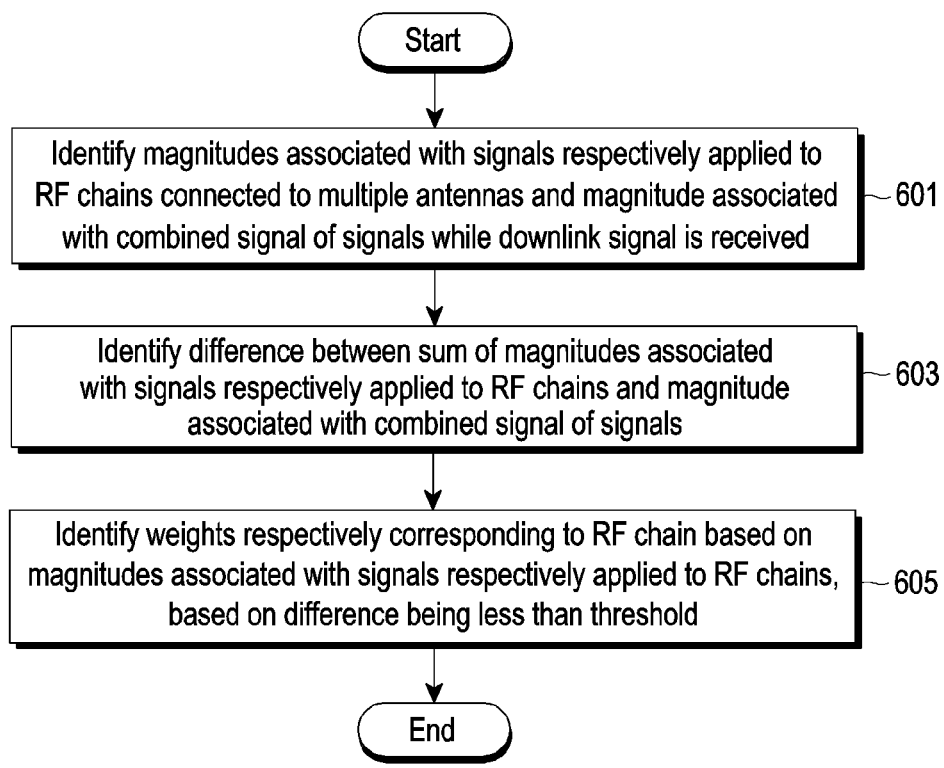
FIG. 6A is a flowchart illustrating an operation method of an electronic device according to an example embodiment.

FIG. 6A is a flowchart illustrating an operation method of an electronic device according to an embodiment.

According to an embodiment, in operation 601, the electronic device 101 (e.g., the modem 560) may identify magnitudes associated with signals respectively applied to RF chains connected, directly or indirectly, to the plurality of antennas 517, 527, 537, 547, and 557 and the magnitude associated with the combined signal of the signals, while the downlink signal is received. For example, the modem 560 may receive the digital values corresponding to the coupled powers Coupled Pwr 1, Coupled Pwr 2, Coupled Pwr 3, Coupled Pwr 4, and Coupled Pwr 5 from the antenna module 500 of FIG. 5A, as magnitudes associated with the signals respectively applied to the RF chains. For example, the modem 560 may receive the digital value corresponding to the internal-branch coupled power Pwr as the magnitude associated with the combined signal of the signals from the antenna module 500 of FIG. 5A. Meanwhile, as described above, the modem 560 may identify the magnitude associated with the combined signal of the signals identified based on the internal branch coupler 504 connected, directly or indirectly, to the front end of the mixer 503 of the antenna module 500 as shown in FIG. 5B. Or, as shown in FIG. 5C, the modem 560 may identify the magnitude associated with the combined signal of the signals identified based on the internal branch coupler 596 of the IFIC 580. Or, as shown in FIG. 5D, the modem 560 may identify the magnitude associated with the combined signal of the signals identified based on the digital reception power detector 596.

According to an embodiment, in operation 603, the electronic device 101 may identify the difference between the sum of the magnitudes associated with the signals respectively applied to the RF chains and the magnitude associated with the combined signal of the signals. In operation 605, the electronic device 101 may identify the weights (or signal transfer coefficients) respectively corresponding to the RF chains based on the magnitudes associated with the signals respectively applied to the RF chains and based on the difference between the sum of the magnitudes associated with the signals respectively applied to the RF chains and the magnitude associated with the combined signal of the signals being less than a threshold. The weights (or signal transfer coefficients) respectively corresponding to the RF chains based on the magnitudes associated with the signals respectively applied to the RF chains may be as shown in, e.g., Table 2. For example, when the difference between the sum of the magnitudes associated with the signals respectively applied to the RF chains and the magnitude associated with the combined signal of the signals is the threshold or more, the effectiveness of the weights (or signal transfer coefficients) identified based on the magnitudes associated with the signals respectively applied to the RF chains may be difficult to ensure. For example, when the magnitude of the interference signal e3 of FIG. 5E is relatively large, the difference between the sum of the magnitudes associated with the signals respectively applied to the RF chains and the magnitude associated with the combined signal of the signals may be the threshold or more. As described above, it is possible to identify the per-RF chain (or per-antenna or per-PA) weights (or signal transfer coefficients) whose effectiveness may be ensured.

Figure 6B:
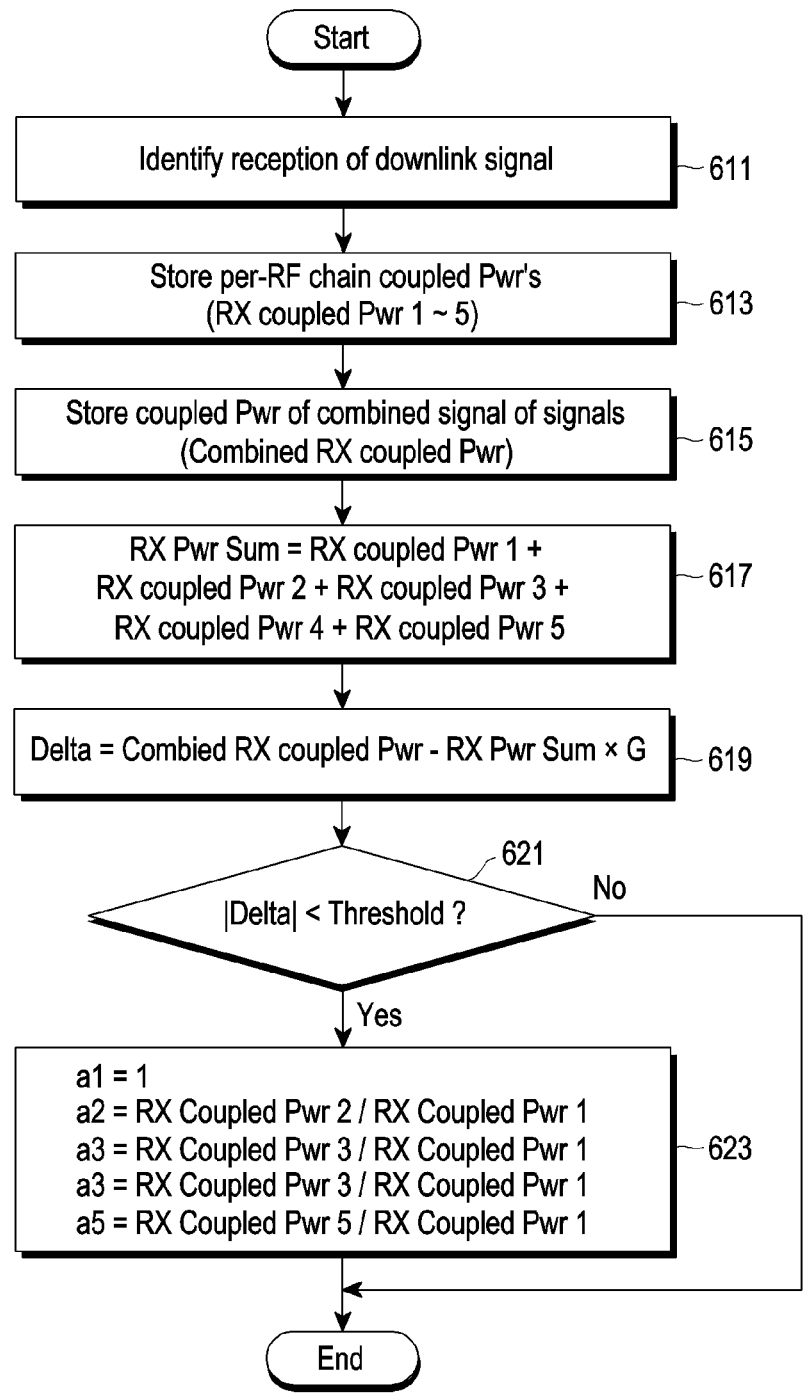
FIG. 6B is a flowchart illustrating an operation method of an electronic device according to an example embodiments.

FIG. 6B is a flowchart illustrating an operation method of an electronic device according to an embodiments.

According to an embodiment, in operation 611, the electronic device 101 (e.g., the modem 560) may identify reception of a downlink signal. The electronic device 101 may detect reception of the RF signal corresponding to the downlink signal and/or identify that it is the time allocated to receive the downlink signal allocated with PDSCH or PDCCH, but it will be appreciated by one of ordinary skill in the art that how to identify reception of the downlink signal is not limited.

According to an embodiment, in operation 613, the electronic device 101 may store per-RF chain coupled Pwr's (which, as RX Coupled Pwr1, RX Coupled Pwr2, RX Coupled Pwr3, RX Coupled Pwr4, and RX Coupled Pwr5, may correspond to Coupled Pwr1, Coupled Pwr2, Coupled Pwr3, Coupled Pwr4, and Coupled Pwr5, respectively, of FIG. 5A) (e.g., the magnitudes associated with the signals respectively applied to the RF chains of FIG. 6A).

In operation 615, the electronic device 101 may store the coupled Pwr (which, as combined RX coupled Pwr, may correspond to the internal-branch coupled Pwr of FIG. 5A) of the combined signal of the signals (e.g., the magnitude associated with the combined signal of the signals of FIG. 6A).

In operation 617, the electronic device 101 may calculate the sum of per-RF chain coupled Pwr's (e.g., the sum of the magnitudes associated with the signals respectively applied to the RF chains of FIG. 6A). The sum of coupled Pwr's (RX Pwr Sum) may be RX Coupled Pwr1+RX Coupled Pwr2+ RX Coupled Pwr3+RX Coupled Pwr4+RX Coupled Pwr5.

In operation 619, the electronic device 101 may identify the difference (delta) between the per-RF chain coupled Pwr's (RX Pwr Sum) and the coupled Pwr of the combined signal of the signals (combined RX coupled Pwr). The difference (delta) may be Combined RX coupled Pwr−RX Pwr Sum X G. Here, G may be, e.g., the gain between the couplers 516, 526, 536, 546, and 556 and the inner branch coupler 504.

According to an embodiment, in operation 621, the electronic device 101 may identify whether the absolute value of the identified difference (delta) is less than a threshold. If the absolute value of the difference is less than the threshold (yes in 621), in operation 623, the electronic device 101 may identify per-RF chain (or per-antenna or per-PA) weights (or signal transfer coefficients). The weights may be as shown in Table 2. If the absolute value of the difference is larger than or equal to the threshold (no in 621), the electronic device 101 may not newly identify the weights. For example, the electronic device 101 may maintain use of the previous weight and/or refrain from performing DPD.

Accordingly, the electronic device 101 may identify per-RF chain (or per-antenna or per-PA) weights (or signal transfer coefficients) that may be ensured for effectiveness. Accordingly, it is possible to prevent or reduce PA linearity deterioration due to DPD as low-effectiveness weights are used.

Figure 7A:
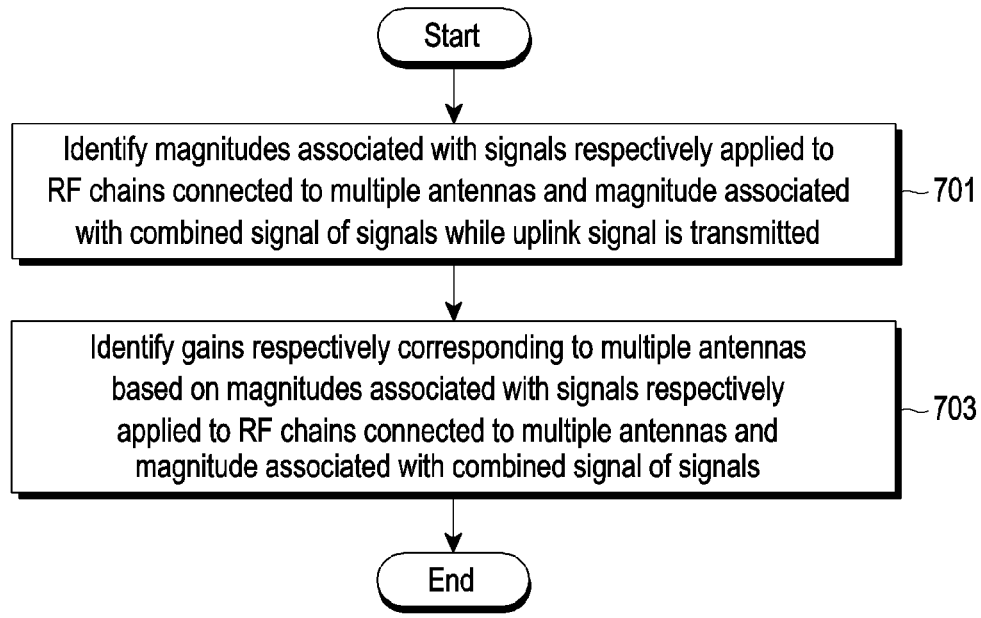
FIG. 7A is a flowchart illustrating an operation method of an electronic device according to an example embodiment.
Figure 7B:
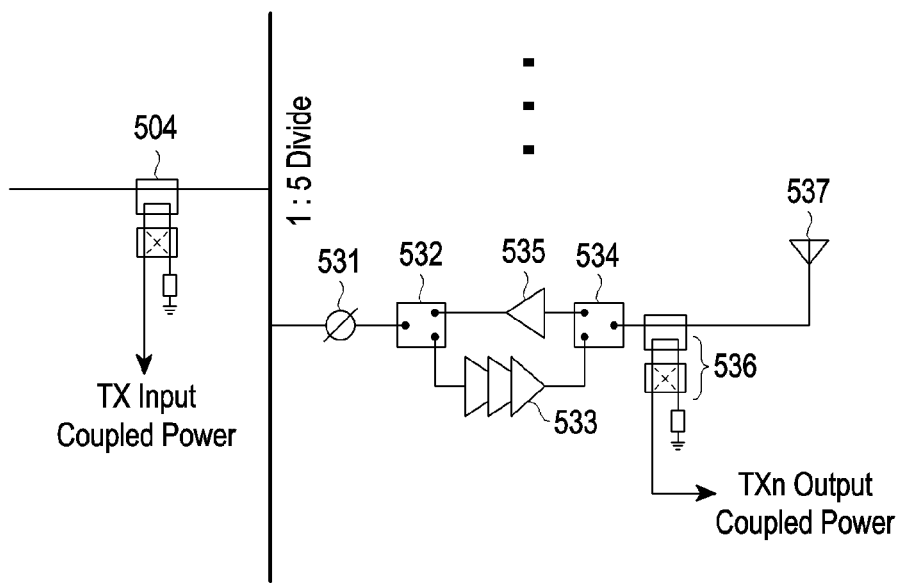
FIG. 7B is a view illustrating a transmission process of an RF signal according to an example embodiment.

FIG. 7A is a flowchart illustrating an operation method of an electronic device according to an embodiment. The embodiment of FIG. 7A is described with reference to FIG. 7B. FIG. 7B is a view illustrating a transmission process of an RF signal according to an embodiment.

According to an embodiment, in operation 701, the electronic device 101 (e.g., the modem 560) may identify magnitudes associated with signals respectively applied to RF chains connected, directly or indirectly, to the plurality of antennas 517, 527, 537, 547, and 557 and the magnitude associated with the combined signal of the signals respectively applied to the RF chains, while the uplink signal is transmitted. For example, the modem 560 may receive the digital values corresponding to the coupled powers Coupled Pwr 1, Coupled Pwr 2, Coupled Pwr 3, Coupled Pwr 4, or Coupled Pwr 5 from the antenna module 500 of FIG. 5A, as magnitudes associated with the signals respectively applied to the RF chains. For example, the modem 560 may receive the digital value corresponding to the internal-branch coupled power Pwr as the magnitude associated with the combined signal of the signals from the antenna module 500 of FIG. 5A. Meanwhile, as described above, the modem 560 may identify the magnitude associated with the combined signal of the signals identified based on the internal branch coupler 504 connected, directly or indirectly, to the front end of the mixer 503 of the antenna module 500 as shown in FIG. 5B. Or, as shown in FIG. 5C, the modem 560 may identify the magnitude associated with the combined signal of the signals identified based on the internal branch coupler 596 of the IFIC 580. Or, as shown in FIG. 5D, the modem 560 may identify the magnitude associated with the combined signal of the signals identified based on the digital transmission power detector 595. Meanwhile, it will be appreciated by one of ordinary skill in the art that the above-described magnitude of the combined signal may be replaced with the magnitude of the IF signal and/or the magnitude of the baseband signal as described in connection with FIGS. 5B to 5D.

According to an embodiment, in operation 703, the electronic device 101 may identify the gains respectively corresponding to the plurality of antennas based on the magnitudes associated with the signals respectively applied to the RF chains connected, directly or indirectly, to the plurality of antennas 517, 527, 537, 547, and 557 and the magnitude associated with the combined signal of the signals. For example, referring to FIG. 7B, the magnitude (TX input coupled power) of the summated RF signal before split may be identified based on the internal branch coupler 504. The RF signal may be 1:5 divided, and the magnitude of the sub RF signal applied to each RF chain may be the value (TX input coupled power/5) obtained by dividing the RF signal magnitude by five. For example, the gain of the third PA 533 may be the value obtained by dividing the output by the input, and may thus be the value obtained by dividing TXn (where n is 3) output coupled power by the TX input coupled power/5. Accordingly, the gain (Gain_n) of the PA included in the nth RF chain may be the value obtained by dividing TXn output coupled power by TX input coupled power/5. As described above, the per-RF chain (or per-PA) transmission gains may be identified.

Figure 7C:
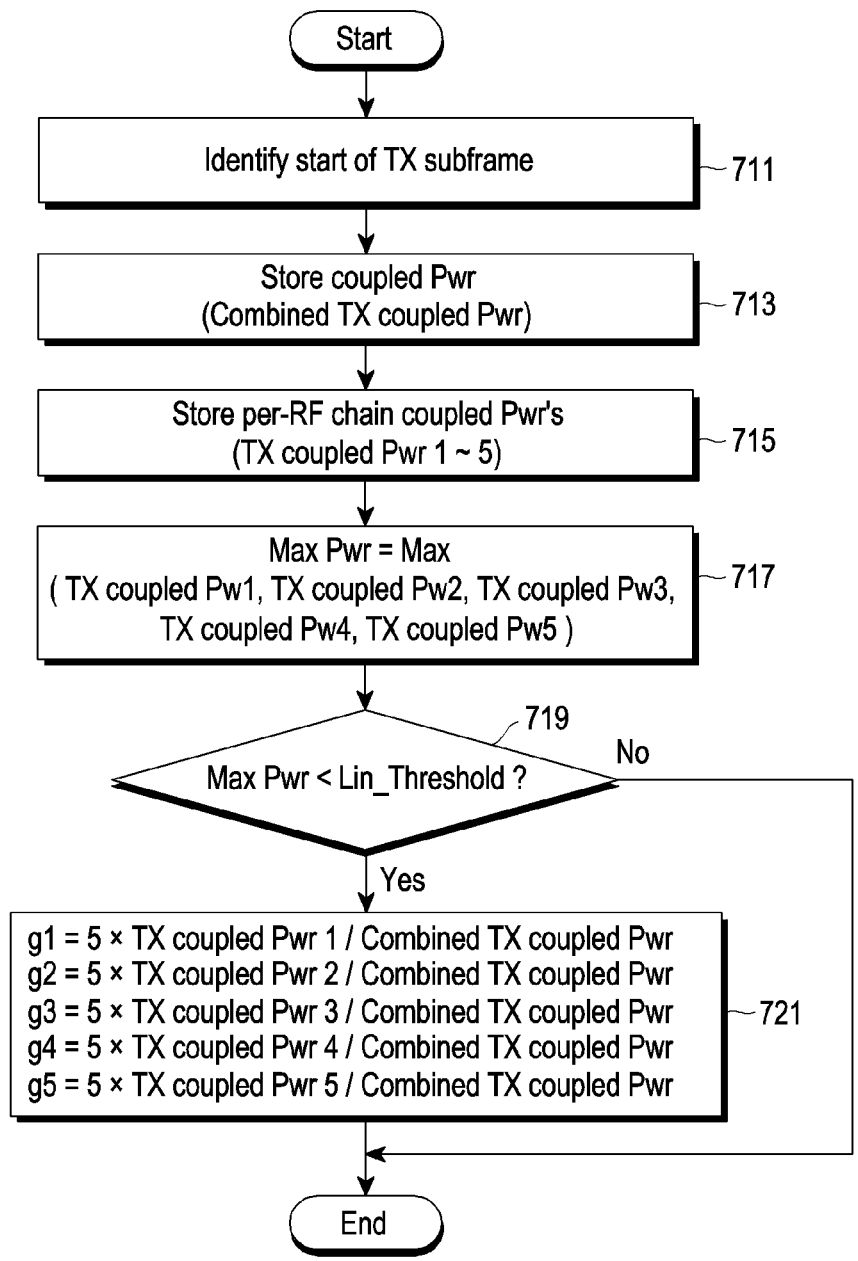
FIG. 7C is a flowchart illustrating an operation method of an electronic device according to an example embodiment.

FIG. 7C is a flowchart illustrating an operation method of an electronic device according to an embodiment.

According to an embodiment, in operation 711, the electronic device 101 (e.g., the modem 560) may identify start of a transmission subframe. Meanwhile, the time unit of subframe is exemplary, and the unit of performing the operations of FIG. 7C (or start unit) is not limited. In operation 713, the electronic device 101 may store the coupled Pwr (which, as combined TX coupled Pwr, may correspond to the internal-branch coupled Pwr of FIG. 5A) of the RF signal before split (e.g., the magnitude associated with the combined signal of the signals of FIG. 7A). In operation 715, the electronic device 101 may store per-RF chain coupled Pwr's (which, as TX Coupled Pwr1, TX Coupled Pwr2, TX Coupled Pwr3, TX Coupled Pwr4, or TX Coupled Pwr5, may correspond to Coupled Pwr1, Coupled Pwr2, Coupled Pwr3, Coupled Pwr4, or Coupled Pwr5, respectively, of FIG. 5A) (e.g., the magnitudes associated with the signals respectively applied to the RF chains of FIG. 7A).

According to an embodiment, in operation 717, the electronic device 101 may identify the maximum and/or high value Max Pwr among the per-RF chain coupled Pwr's (TX Coupled Pwr1, TX Coupled Pwr2, TX Coupled Pwr3, TX Coupled Pwr4, or TX Coupled Pwr5). In operation 719, the electronic device 101 may identify whether the maximum and/or high value Max Pwr is less than the linearity threshold Lin_Threshold. If the maximum value Max Pwr is less than the linearity threshold Lin_Threshold (yes in 719), the electronic device 101 may identify per-RF chain (or per-antenna, or per-PA) transmission gains in operation 721. The per-RF chain (or per-antenna or per-PA) transmission gains may be as shown in Table 3.

TABLE 3

| | |
|---|---|
| g1 | 5 X TX coupled Pwr 1/Combined TX coupled Pwr |
| g2 | 5 X TX coupled Pwr 2/Combined TX coupled Pwr |
| g3 | 5 X TX coupled Pwr 3/Combined TX coupled Pwr |
| g4 | 5 X TX coupled Pwr 4/Combined TX coupled Pwr |
| g5 | 5 X TX coupled Pwr 5/Combined TX coupled Pwr |

If the maximum value Max Pwr is the linearity threshold Lin_Threshold or more (no in 719), the electronic device 101 may not newly identify transmission gains. For example, the electronic device 101 may maintain use of the previous transmission gain and/or refrain from performing DPD. Accordingly, the electronic device 101 may identify per-RF chain (or per-antenna or per-PA) transmission gains that may be ensured for effectiveness. Accordingly, it is possible to prevent or reduce PA linearity deterioration due to DPD as low-effectiveness transmission gains are used.

Figure 8A:
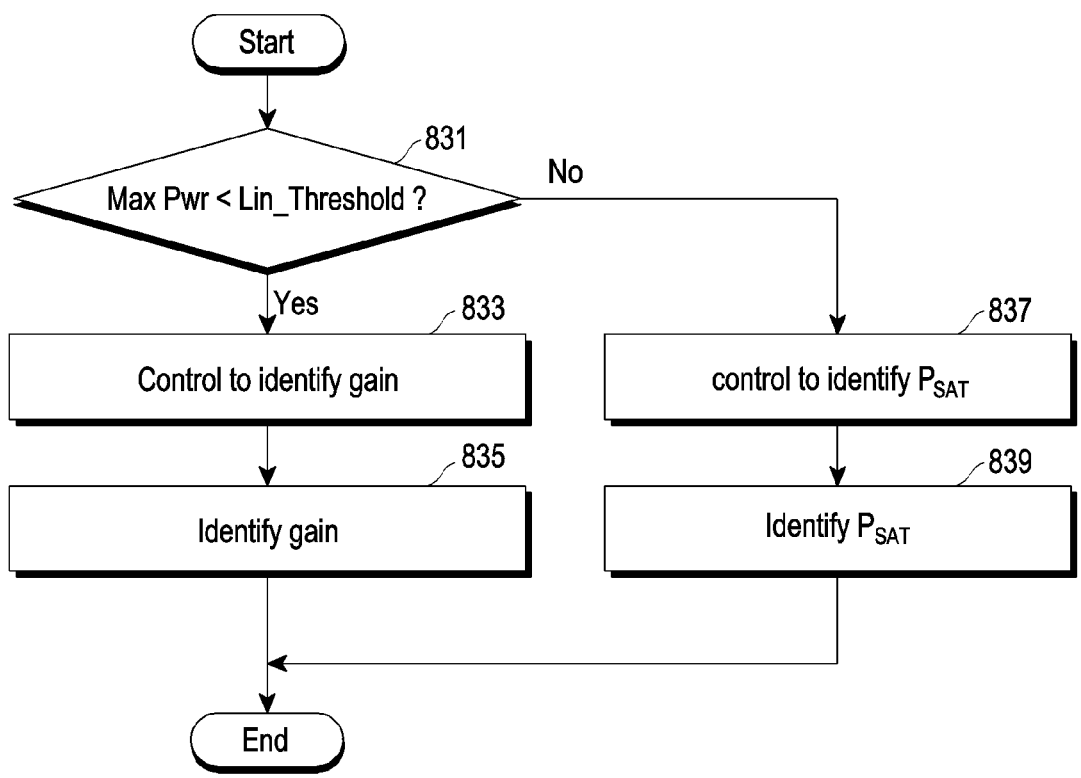
FIG. 8A is a flowchart illustrating an operation method of an electronic device according to an example embodiment.
Figure 8B:
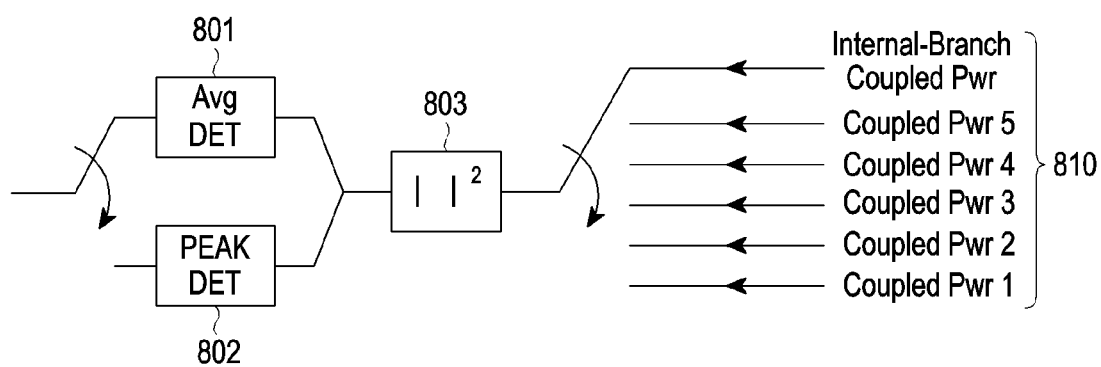
FIG. 8B is a view illustrating switching between average power detection and peak detection according to an example embodiment.

FIG. 8A is a flowchart illustrating an operation method of an electronic device according to an embodiment. The embodiment of FIG. 8A is described with reference to FIG. 8B. FIG. 8B is a view illustrating switching between average power detection and peak detection according to an embodiment.

According to an embodiment, in operation 831, the electronic device 101 (e.g., the antenna module 500 comprising at least one antenna) may identify whether the maximum/high value Max Pwr among the per-RF chain coupled Pwr's (TX Coupled Pwr1, TX Coupled Pwr2, TX Coupled Pwr3, TX Coupled Pwr4, or TX Coupled Pwr5) is less than the linearity threshold Lin_Threshold. If the maximum/high value Max Pwr is less than the linearity threshold Lin_Threshold (yes in 831), the electronic device 101 may control to identify the per-RF chain gains (e.g., the gains as in operation 721 of FIG. 7B) in operation 833. In operation 835, the electronic device 101 may identify the gains. For example, referring to FIG. 8B, the internal-branch coupled power Pwr and coupled powers (Coupled Pwr 1, Coupled Pwr 2, Coupled Pwr 3, Coupled Pwr 4, or Coupled Pwr 5) 810 may be provided. The power detector 803 may detect (801) the average power of each power 810 based on the received powers 810 or detect (802) the peak value of each power 810. For example, when the maximum/high value Max Pwr is less than the linearity threshold Lin_Threshold, the antenna module 500 may detect (801) the average power value of the powers 810 to identify the gain. The antenna module 500 may provide the average power value of each power 810 to the modem 560. The modem 560 may identify per-RF chain (or per-antenna or per-PA) gains based on the respective average power values of the powers 810. The gains may be as shown in Table 3, for example. For example, the modem 560 may identify the per-RF chain average values as TX coupled Pwr 1 to 5 identified in operation 715 of FIG. 7B.

If the maximum/high value Max Pwr is the linearity threshold Lin_Threshold or more (no in 831), the electronic device 101 may control to identify $P_{SAT}$ in operation 837 according to an embodiment. In operation 839, the electronic device 101 may identify $P_{SAT}$. For example, referring to FIG. 8B, the internal-branch coupled power Pwr and coupled powers (Coupled Pwr 1, Coupled Pwr 2, Coupled Pwr 3, Coupled Pwr 4, or Coupled Pwr 5) 810 may be provided. When the maximum/high value Max Pwr is the linearity threshold Lin_Threshold or more, the antenna module 500 may detect (802) the peak value of each of the powers 810 to identify $P_{SAT}$. The antenna module 500 may provide the peak value of each power 810 to the modem 560. The modem 560 may identify per-RF chain (or per-antenna or per-PA) $P_{SAT}$ based on the respective peak values of the powers 810. The method for identifying $P_{SAT}$ is described with reference to FIGS. 9 and 10.

Meanwhile, it will be appreciated by one of ordinary skill in the art that the condition for identifying the gain or $P_{SAT}$ depending on whether the maximum/high value Max Pwr in operation 831 of FIG. 8A is less than the linearity threshold Lin_Threshold is merely an example, and is not limited. In some cases, it will be appreciated by one of ordinary skill in the art that the electronic device 101 (e.g., the antenna module 500) may simultaneously identify at least part of the gain and $P_{SAT}$.

Figure 9:
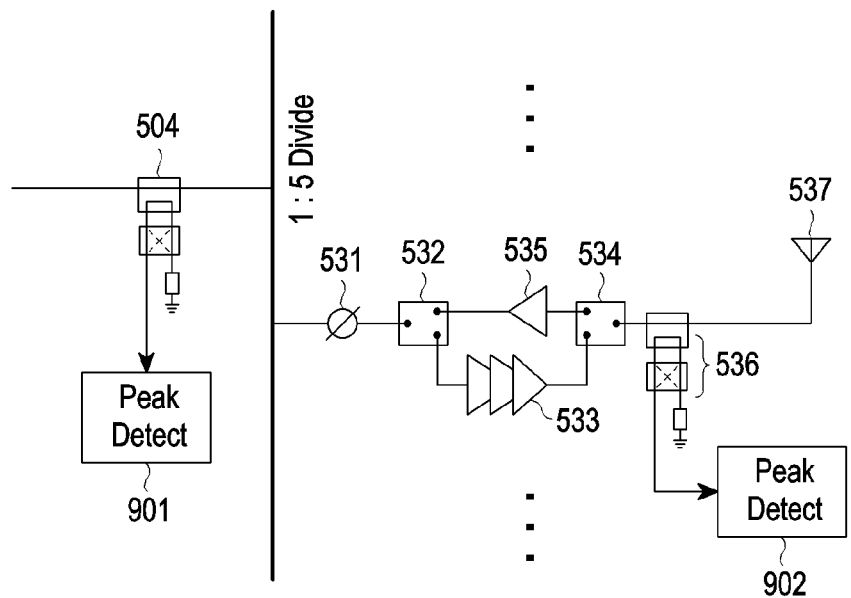
FIG. 9 is a view illustrating identifying $P_{SAT}$ according to an example embodiment.
Figure 9:
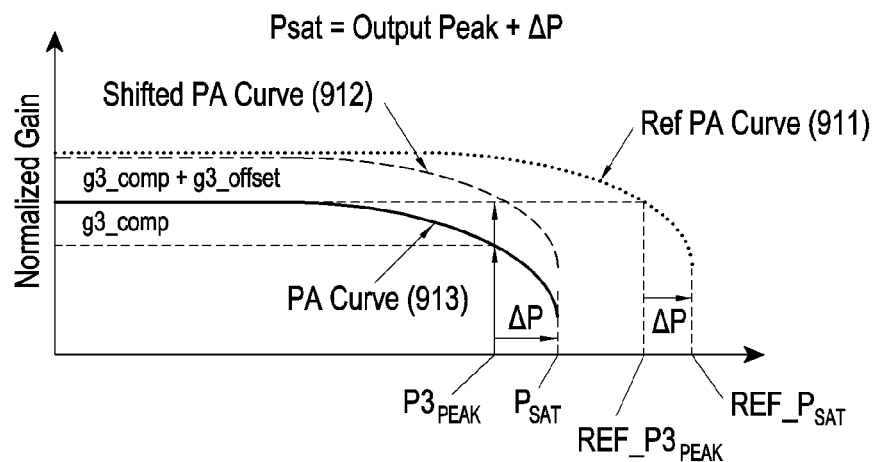
Figure 9:
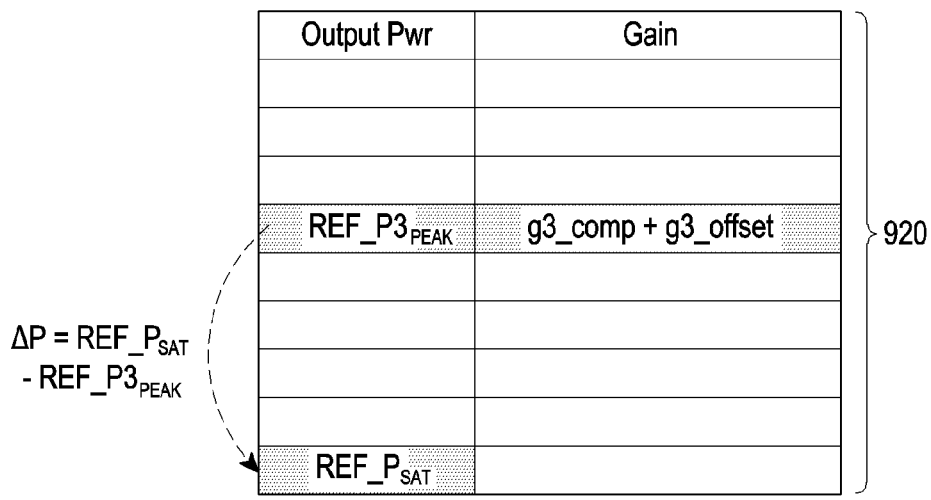

FIG. 9 is a view illustrating identifying $P_{SAT}$ according to an embodiment.

According to an embodiment, the peak value of the coupling signal from the internal branch coupler 504 may be identified by the peak detector 901. The peak detector 901 may be included in, e.g., the power detector 506 of FIG. 5A. As described above, although the PA curve may be shifted in the x-axis direction and/or y-axis direction by the antenna impedance, frequency, and/or PA characteristics, the shape of the PA curve may not substantially be changed. FIG. 9 illustrates a reference PA curve 911, a PA curve 912 shifted in the x-axis direction, and a PA curve 913 shifted in both the x-axis direction and y-axis direction. Since only a shift in the x-axis direction and/or y-axis direction occurs with no shape changed, $P_{SAT}$ may be estimated based on the reference PA curve 911 and the shifted PA curve (e.g., 912 or 913). For example, the modem 560 may store a lookup table 920 for association information between the magnitude and gain of the output power Pwr associated with the reference PA curve 911 in the internal memory 561 or read it from an external memory. For example, a process of estimating $P_{SAT}$ corresponding to the third antenna 537 is described. The peak value of the coupling signal from the coupler 536 may be detected by the peak detector 902. The peak value of the coupling signal from the internal branch coupler 504 may be identified by the peak detector 901. Meanwhile, since the PA may be in a compression range in the power peak area, the gain identified in the peak area may be smaller than the gain identified based on the average power. For example, the compressed gain identified based on the peak corresponding to the third antenna 537 may be denoted as g3_comp. The nth compressed gain may be denoted as gn_comp. Further, the difference between the gain corresponding to the reference PA curve 911 and the gain identified based on the average power associated with the third antenna 537 may be denoted as g3_offset. The difference between the gain corresponding to the reference PA curve 911 and the nth gain (e.g., the gain of Table 3) may be denoted as gn_offset. The gain corresponding to the reference PA curve 911 may be the constant value gain of the range before compressed in the reference PA curve 911, but is not limited. The modem 560 may identify the sum of g3_comp and g3_offset and be referred to as a summated gain. The modem 560 may identify the output power REF_P3$_{PEAK}$ corresponding to the summated gain (g3_comp+g3_offset) by referring to the reference PA lookup table 920. The difference between the output power (REF_P3$_{PEAK}$) corresponding to summated gain (g3_comp+g3_offset) and the REF_P$_{SAT}$ which is the saturated power of the reference PA curve 911 may be denoted as ΔP. ΔP may be REF_P$_{SAT}$ of reference PA curve 911—the output power (REF_P3$_{PEAK}$) corresponding to the summated gain (g3_comp+g3_offset). The current PA curve 913 may be shifted along the x axis and y axis to match the reference PA curve 911. For example, when the peak power P3$_{PEAK}$ measured on the current PA curve 913 is shifted along the x axis and y axis, it may become the output power REF_P3$_{PEAK}$ of the reference PA curve 911. Meanwhile, the last index of the lookup table 920 of the reference PA curve 911 may be REF_P$_{SAT}$ corresponding to the reference PA curve 911. The measured peak power P3$_{PEAK}$ plus ΔP may be the estimated P$_{SAT}$ of the current PA curve 913. Accordingly, P$_{SAT}$ corresponding to the third antenna 537 (or corresponding to the RF chain or PA 533 corresponding to the third antenna 537) may be denoted as P3$_{PEAK}$+REF_P$_{SAT}$−REF_P3$_{PEAK}$. Further, the nth P$_{SAT}$ may be denoted as Pn$_{PEAK}$+REF_P$_{SAT}$−REF_Pn$_{PEAK}$.

Figure 10:
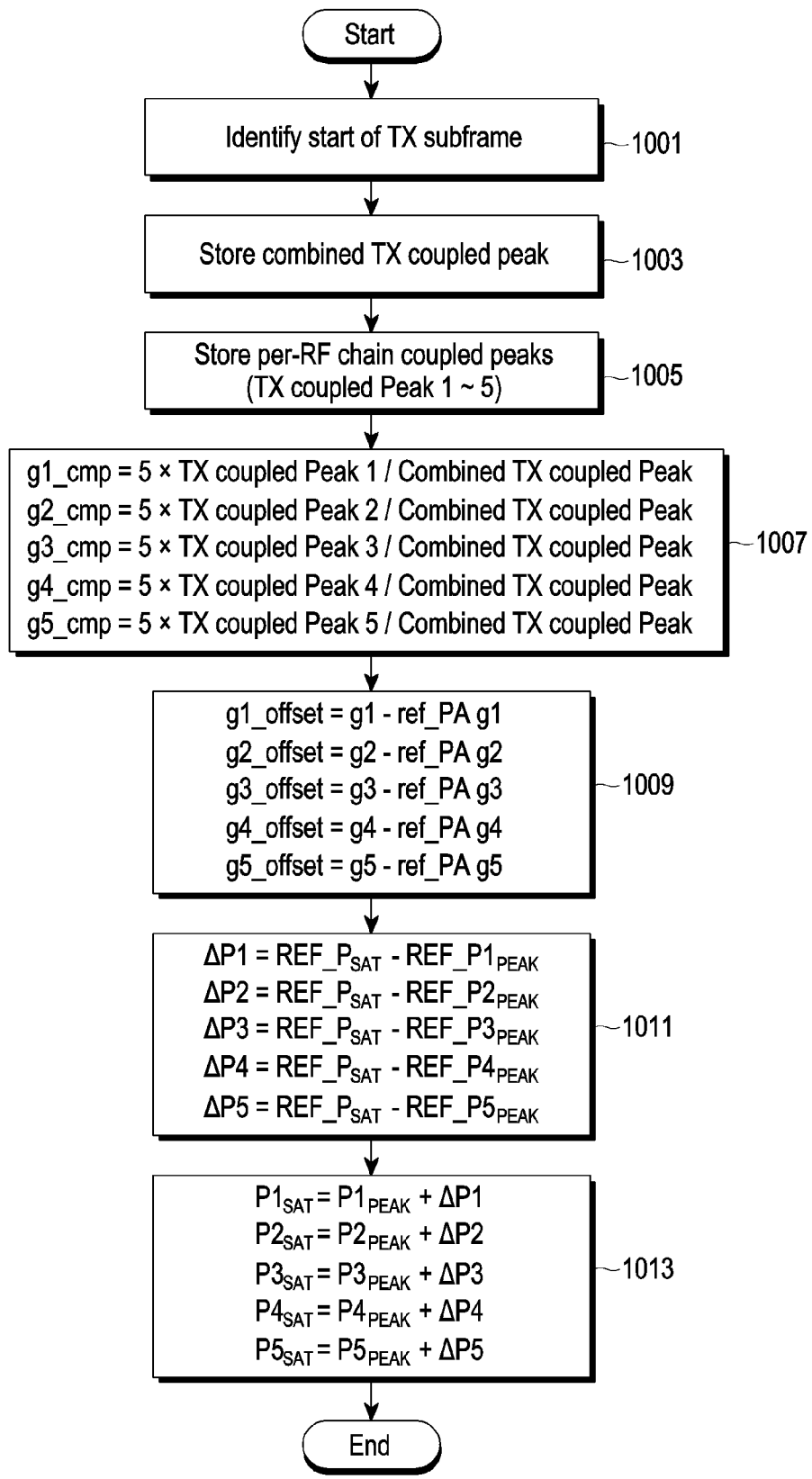
FIG. 10 is a flowchart illustrating operations of an electronic device according to an example embodiment.

FIG. 10 is a flowchart illustrating operations of an electronic device according to an embodiment.

According to an embodiment, in operation 1001, the electronic device 101 (e.g., the modem 560) may identify start of a transmission subframe. Meanwhile, the time unit of subframe is exemplary, and the unit of performing the operations of FIG. 10 (or start unit) is not limited. In operation 1003, the electronic device 101 may store the coupled peak (which, as combined TX coupled peak, may correspond to the internal-branch coupled Pwr of FIG. 5A and may correspond to the peak value) of the RF signal before split. In operation 1005, the electronic device 101 may store per-RF chain coupled peaks (which, as TX Coupled Peak1, TX Coupled Peak2, TX Coupled Peak3, TX Coupled Peak4, or TX Coupled Peak5, may correspond to Coupled Pwr1, Coupled Pwr2, Coupled Pwr3, Coupled Pwr4, or Coupled Pwr5, respectively, of FIG. 5A and may correspond to the peak values).

According to an embodiment, in operation 1007, the electronic device 101 may identify gains (g1_comp, g2_comp, g3_comp, g4_comp, and g5_comp) based on per-RF chain (or per-antenna or per-PA) peak values. For convenience of description, this may be referred to as a peak-based gain. The per-RF chain (or per-antenna or per-PA) peak value-based gains (g1_comp, g2_comp, g3_comp, g4_comp, and g5_comp) may be shown in Table 4, for example.

TABLE 4

| g1_cmp | 5 X TX coupled Peak 1/Combined TX coupled Peak |
|---|---|
| g2_cmp | 5 X TX coupled Peak 2/Combined TX coupled Peak |
| g3_cmp | 5 X TX coupled Peak 3/Combined TX coupled Peak |
| g4_cmp | 5 X TX coupled Peak 4/Combined TX coupled Peak |
| g5_cmp | 5 X TX coupled Peak 5/Combined TX coupled Peak |

The per-RF chain (or per-antenna or per-PA) peak value-based gains (g1_comp, g2_comp, g3_comp, g4_comp, and g5_comp) of Table 4 may be ones in which the notation is changed from Pwr to Peak as compared with the average power-based gains g, g2, g3, g4, and g5 of Table 3, which may be attributed to use of the peak value of the coupling signal.

According to an embodiment, in operation 1009, the electronic device 101 may identify per-RF chain (or per-antenna or per-PA) gain offsets (g1_offset, g2_offset, g3_offset, g4_offset, and g5_offset). As described with reference to FIG. 9, the definition of the gain offset gn_offset may be the value obtained by subtracting the gain corresponding to the nth reference PA curve (which may be denoted as ref_PA gn) from the average power-based gain gn. The gain corresponding to the reference PA curve may be, e.g., a gain of a constant value before the compression section in the reference PA curve, but is not limited thereto. Meanwhile, although it has been described above that the reference PA curves are different for each RF chain, this is exemplary, and the reference PA curves of at least two RF chains may be the same. For example, the gain corresponding to the reference PA curve may be the gain of a constant value before the compression section in the reference PA lookup table. The gain offset gn_offset may be as shown in Table 5.

TABLE 5

| g1_offset | g1 − ref_PA g1 |
|---|---|
| g2_offset | g2 − ref_PA g2 |
| g3_offset | g3 − ref_PA g3 |
| g4_offset | g4 − ref_PA g4 |
| g5_offset | g5 − ref_PA g5 |

According to an embodiment, in operation 1011, the electronic device 101 may identify per-RF chain (or per-antenna or per-PA) power differences (ΔP1, ΔP2, ΔP3, ΔP4, and ΔP5). The power differences ΔP1, ΔP2, ΔP3, ΔP4, and ΔP5 may be as shown in Table 6.

TABLE 6

| ΔP1 | REF_$P_{SAT}$ − REF_$P1_{PEAK}$ |
|---|---|
| ΔP2 | REF_$P_{SAT}$ − REF_$P2_{PEAK}$ |
| ΔP3 | REF_$P_{SAT}$ − REF_$P3_{PEAK}$ |
| ΔP4 | REF_$P_{SAT}$ − REF_$P4_{PEAK}$ |
| ΔP5 | REF_$P_{SAT}$ − REF_$P5_{PEAK}$ |

As described above, in Table 6, REF_$P_{SAT}$ may be $P_{SAT}$ of the reference PA curve. REF_$Pn_{PEAK}$ in Table 6 is the output power corresponding to the summated gain (gn_comp+gn_offset) on the lookup table as described above.

According to an embodiment, in operation 1013, the electronic device 101 may identify per-RF chain (or per-antenna or per-PA) $P_{SAT}$. The per-RF chain (or per-antenna or per-PA) $P_{SAT}$ may be denoted as $Pn_{SAT}$ and may be as shown in Table 7.

TABLE 7

| $P1_{SAT}$ | $P1_{PEAK}$ + ΔP1 |
|---|---|
| $P2_{SAT}$ | $P2_{PEAK}$ + ΔP2 |
| $P3_{SAT}$ | $P3_{PEAK}$ + ΔP3 |
| $P4_{SAT}$ | $P4_{PEAK}$ + ΔP4 |
| $P5_{SAT}$ | $P5_{PEAK}$ + ΔP5 |

In Table 7, $Pn_{PEAK}$ may be the peak value associated with the coupling signal provided from the coupler of the nth RF chain. As described above, the per-RF chain (or per-antenna or per-PA) $P_{SAT}$ may be identified.

Figure 11A:
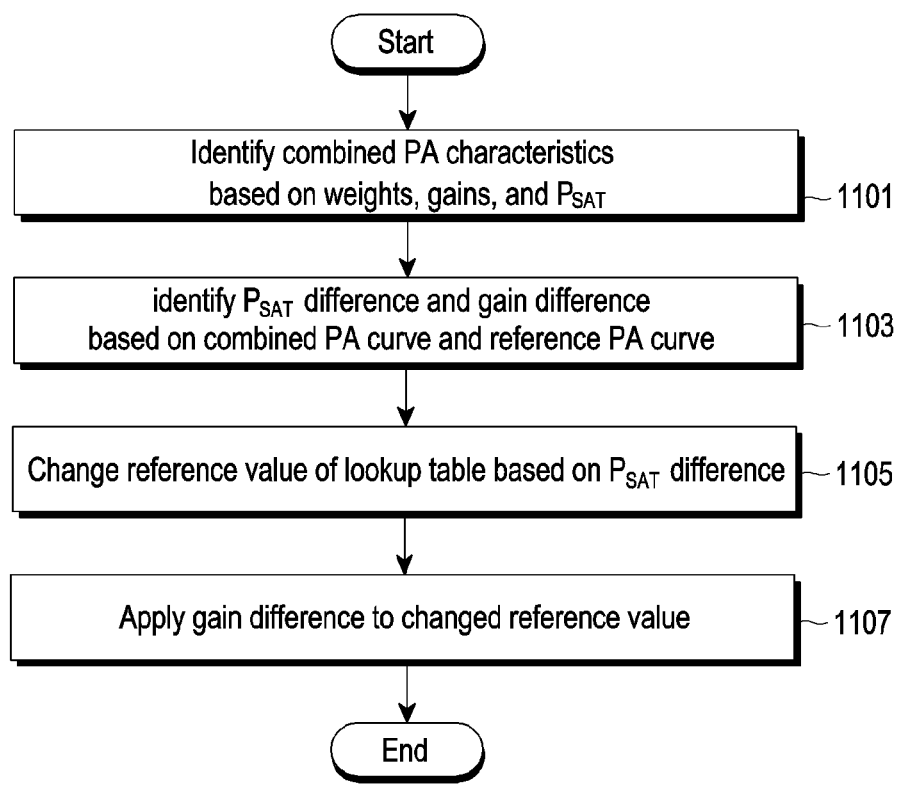
FIG. 11A is a flowchart illustrating operations of an electronic device according to an example embodiment.
Figure 11B:
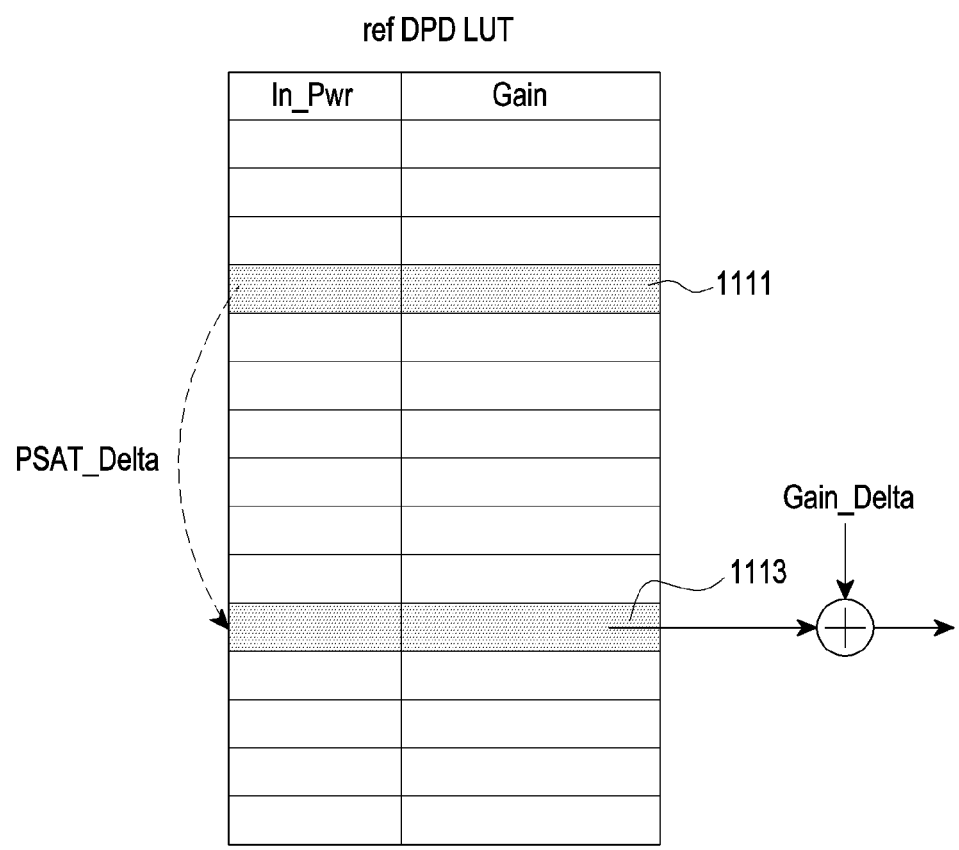
FIG. 11B is a view illustrating performing DPD according to an example embodiment.

FIG. 11A is a flowchart illustrating operations of an electronic device according to an embodiment. The embodiment of FIG. 11A is described with reference to FIG. 11B. FIG. 11B is a view illustrating performing DPD according to an embodiment.

According to an embodiment, in operation 1101, the electronic device 101 (e.g., the modem 560) may identify the per-RF chain (or per-antenna or per-PA) weights a1, a2, a3, a4, and a5, gains g1, g2, g3, g4, and g5, and/or $P_{SAT}$. In operation 1103, the electronic device 101 may identify the difference in $P_{SAT}$ between two PA curves and the difference in gain between two PA curves based on the combined PA curve and reference PA curve. Meanwhile, the per-RF chain (or per-antenna or per-PA) weights a1, a2, a3, a4, and a5, gains g1, g2, g3, g4, and g5, and/or $P_{SAT}$ being identified based on calculations is merely an example, and at least some of the weights a1, a2, a3, a4, and a5, gains g1, g2, g3, g4, and g5, and $P_{SAT}$ may be fixed values in which case no calculation may be performed on the fixed values. Gn_offset and Psatn_offset may be identified as follows to identify the inter-PA curve $P_{SAT}$ difference and the inter-PA curve gain difference.

Gn_offset=gn−ref PA curve gain (n=1 to 5), (where, gn may be the gain based on the average power for each RF chain, and ref PA curve gain may be the gain of the reference PA curve)

psatn_offset=psatn−ref PA curve past (n=1 to 5), (where, psatn may be $P_{SAT}$ for each RF chain, and ref PA curve past may be $P_{SAT}$ of the reference PA curve)

According to an embodiment, the electronic device 101 may identify the combined PA curve based on the weighted sum of the PA curves shifted per RF chain. The PA curve resultant from shifting the reference PA curve by gn_offset and psatn_offset may be the PA curve shifted for each RF chain, and this may be denoted as "ref PA curve shifted by gn_offset, psatn_offset." The combined PA curve which is the weighted sum may be denoted as Equation 1.

$$\text{combined curve} = \sum_n a_n \times (ref\ PA\text{ curve shifted by gn\_offset, psatn\_offset}) \quad \text{[Equation 1]}$$

Accordingly, if n is 1 to 5, the combined PA curve may be represented as a1×(ref PA curve shifted by g1_offset, psat1_offset)+a2×(ref PA curve shifted by g2_offset, psat2_offset)+a3×(ref PA curve shifted by g3_offset, psat3_offset)+a4×(ref PA curve shifted by g4_offset, psat4_offset)+a5×(ref PA curve shifted by g5_offset, psat5_offset). Here, the shift and/or weighted sum of the PA curve may be the shift and/or weighted sum of the LUT. The electronic device 101 may compare the combined PA curve and the reference PA curve and identify the $P_{SAT}$ difference (PSAT delta) between PA curves which is the offset along the x axis and the gain difference (Gain delta) between PA curves which is the offset along the y axis.

According to an embodiment, in operation 1105, the electronic device 101 may change the reference value of the DPD lookup table based on the inter-PA curve $P_{SAT}$ difference (PSAT delta). The DPD lookup table may reflect the relationship information between the input value (input power) and the gain for DPD corresponding thereto. For example, referring to FIG. 11B, the gain 1111 corresponding to a specific input power may be defined in the reference lookup table for DPD. The electronic device 101 may identify the gain 1113 corresponding to the specific input power plus the inter-PA curve $P_{SAT}$ difference (PSAT delta), rather than the gain 1111 corresponding to the specific input power. In operation 1107, the electronic device 101 may identify the final adjusted gain by applying (e.g., adding) the inter-PA curve gain difference (Gain delta), which is the offset, to the changed reference value. The electronic device 101 may perform DPD by applying the adjusted gain to the baseband signal. Accordingly, a DPD-performed baseband signal may be provided.

According to an embodiment, an antenna module 500 may comprise antennas 517, 527, 537, 547, and 557, RF chains 510, 520, 530, 540, and 550 connected, directly or indirectly, to the antennas 517, 527, 537, 547, and 557, a splitter/combiner 508 connected, directly or indirectly, to the RF chains 510, 520, 530, 540, and 550, a mixer 503 configured to upconvert an IF signal input to the antenna module 500 into a transmission RF signal and output the upconverted signal to the splitter/combiner 508 and/or to downconvert a reception RF signal which is a combination of signals from the RF chains 510, 520, 530, 540, and 550 provided from the splitter/combiner 508, a plurality of first couplers 516, 526, 536, 546, and 556 connected, directly or indirectly, between the RF chains 510, 520, 530, 540, and 550 and the antennas, a second coupler 504 for measuring a magnitude corresponding to a transmission RF signal before split by the splitter/combiner 508 and/or the reception RF signal combined by the splitter/combiner 508, and a power detector 506 configured to provide a plurality of magnitudes of a plurality of signals from the plurality of first couplers 516, 526, 536, 546, and 556 and a magnitude of a signal from the second coupler 504. Each of the plurality of first couplers 516, 526, 536, 546, and 556 may be disposed between the antennas 517, 527, 537, 547, and 557 and the splitter/combiner 508. The reception RF signal may be downconverted by the mixer and provided to an intermediate frequency IC 580 connected, directly or indirectly, to the antenna module 500, and the transmission RF signal may be generated by upconverting the IF signal provided from the intermediate frequency IC 580 by the mixer.

According to an embodiment, the second coupler 504 may be connected, directly or indirectly, between the mixer 503 and the splitter/combiner 508.

According to an embodiment, the second coupler 504 may be connected, directly or indirectly, to an input terminal of the mixer 503 where the IF signal is provided.

According to an embodiment, the antenna module may further comprise at least one ADC 507 configured to convert the plurality of magnitudes of the plurality of signals from the plurality of first couplers 516, 526, 536, 546, and 556 and the magnitude of the signal from the second coupler 504 into a digital value. The antenna module may further comprise an interface 505 configured to provide a plurality of digital values output from the at least one ADC 507 to a modem.

According to an embodiment, each of a plurality of magnitudes of a plurality of first signals from the plurality of first couplers 516, 526, 536, 546, and 556 may be identified based on respective average values of the plurality of first signals. A magnitude of a second signal from the second coupler 504 may be identified based on an average value of the second signal.

According to an embodiment, each of the plurality of magnitudes of the plurality of signals from the plurality of first couplers 516, 526, 536, 546, and 556 and the magnitude of the signal from the second coupler 504 may be identified based on the respective average values of the plurality of first signals and the average value of the second signal, based on a maximum and/or high value among respective signals of the RF chains 510, 520, 530, 540, and 550 provided from the splitter/combiner 508 being less than a designated linearity threshold.

According to an embodiment, each of a plurality of magnitudes of a plurality of first signals from the plurality of first couplers 516, 526, 536, 546, and 556 may be identified based on respective peak values of the plurality of first signals. A magnitude of a second signal from the second coupler 504 may be identified based on a peak value of the second signal.

According to an embodiment, each of the plurality of magnitudes of the plurality of signals from the plurality of first couplers 516, 526, 536, 546, and 556 and the magnitude of the signal from the second coupler 504 may be identified based on the respective peak values of the plurality of first signals and the peak value of the second signal, based on a maximum and/or high value among respective signals of the RF chains 510, 520, 530, 540, and 550 provided from the splitter/combiner 508 being the designated linearity threshold or more.

Each embodiment herein may be used in combination with any other embodiment(s) described herein.

According to an embodiment, an electronic device 101 (for example, a modem 560, hereinafter, referred to as a modem 560) may include at least one processor 120, 212, 214, 564 and/or 567 and at least one memory 130, 561. The at least one memory may store at least one instruction that, when executed by the at least one processor 120, 212, 214, 564 and/or 567, enables the modem 560 to identify magnitudes associated with sub reception RF signals respectively applied to RF chains 510, 520, 530, 540, and 550 connected, directly or indirectly, to a plurality of antennas 517, 527, 537, 547, and 557, and a magnitude associated with a combined reception RF signal of the sub reception RF signals. The at least one memory may store at least one instruction that, when executed by the at least one processor 120, 212, 214, 564 and/or 567, enables the modem 560 to identify a difference between a sum of the magnitudes and the magnitude. The at least one memory may store at least one instruction that, when executed by the at least one processor 120, 212, 214, 564 and/or 567, enables the modem 560 to identify weights respectively corresponding to the RF chains 510, 520, 530, 540, and 550 based on the magnitudes, based on the difference being a threshold or less.

According to an embodiment, the at least one instruction, when executed by the at least one processor 120, 212, 214, 564 and/or 567, may enable the modem 560 to, as at least part of identifying the weights respectively corresponding to the RF chains 510, 520, 530, 540, and 550 based on the magnitudes, identify the weights by dividing each of the magnitudes by one value among the magnitudes.

According to an embodiment, the at least one instruction, when executed by the at least one processor 120, 212, 214, 564 and/or 567, may enable the modem 560 to distort and output a baseband signal based on the weights.

According to an embodiment, the at least one instruction, when executed by the at least one processor 120, 212, 214, 564 and/or 567, may enable the modem 560 to, as at least part of distorting and outputting the baseband signal based on the weights, identify third magnitudes associated with first sub transmission RF signals respectively applied to the RF chains 510, 520, 530, 540, and 550 and a fourth magnitude associated with a transmission RF signal before the first sub transmission RF signals are split. According to an embodiment, the at least one instruction, when executed by the at least one processor 120, 212, 214, 564 and/or 567, may enable the modem 560 to, as at least part of distorting and outputting the baseband signal based on the weights, identify gains respectively corresponding to the RF chains 510, 520, 530, 540, and 550, based on the third magnitudes and the fourth magnitude. The third magnitudes and the fourth magnitude may be identified based on average values of coupling signals corresponding to the first sub transmission RF signals and an average value of the transmission RF signal before the first sub transmission RF signals are split.

According to an embodiment, the at least one instruction, when executed by the at least one processor 120, 212, 214, 564 and/or 567, may enable the modem 560 to, as at least part of identifying the gains respectively corresponding to the RF chains 510, 520, 530, 540, and 550, based on the third magnitudes and the fourth magnitude, identify the gains respectively corresponding to the RF chains 510, 520, 530, 540, and 550 by dividing a value obtained by multiplying each of the third magnitudes by a number of the RF chains 510, 520, 530, 540, and 550, by the fourth magnitude.

According to an embodiment, the gains respectively corresponding to the RF chains 510, 520, 530, 540, and 550 may be identified based on a maximum and/or high value among the third values being less than a designated linearity threshold.

According to an embodiment, the at least one instruction, when executed by the at least one processor 120, 212, 214, 564 and/or 567, may enable the modem 560 to, as at least part of distorting and outputting the baseband signal based on the weights, identify fifth magnitudes associated with second sub transmission RF signals respectively applied to the RF chains 510, 520, 530, 540, and 550 and a sixth magnitude associated with a second transmission RF signal before the second sub transmission RF signals are split. The at least one instruction, when executed by the at least one processor 120, 212, 214, 564 and/or 567, may enable the modem 560 to, as at least part of distorting and outputting the baseband signal based on the weights, identify saturated output powers respectively corresponding to the RF chains 510, 520, 530, 540, and 550, based on the fifth magnitudes and the sixth magnitude. The fifth magnitudes and the sixth magnitude may be identified based on peak values of coupling signals corresponding to the second sub transmission RF signals and a peak value of the second transmission RF signal.

According to an embodiment, the at least one instruction, when executed by the at least one processor 120, 212, 214, 564 and/or 567, may enable the modem 560 to, as at least part of identifying the saturated output powers respectively corresponding to the RF chains 510, 520, 530, 540, and 550, based on the fifth magnitudes and the sixth magnitude, identify peak-based gains respectively corresponding to the RF chains 510, 520, 530, 540, and 550, based on the fifth magnitudes and the sixth magnitude. The at least one instruction, when executed by the at least one processor 120, 212, 214, 564 and/or 567, may enable the modem 560 to, as at least part of identifying the saturated output powers respectively corresponding to the RF chains 510, 520, 530, 540, and 550, based on the fifth magnitudes and the sixth magnitude, identify gain offsets respectively corresponding to the RF chains 510, 520, 530, 540, and 550 by subtracting a gain of a reference PA lookup table associated with each of the RF chains 510, 520, 530, 540, and 550 from each of gains respectively corresponding to the RF chains 510, 520, 530, 540, and 550. Each of the gains respectively corresponding to the RF chains 510, 520, 530, 540, and 550 may be identified based on the average values of coupling signals corresponding to the first sub transmission RF signals and the average value of the transmission RF signal before the first sub transmission RF signals are split. According to an embodiment, the at least one instruction, when executed by the at least one processor 120, 212, 214, 564 and/or 567, may enable the modem 560 to, as at least part of identifying the saturated output powers respectively corresponding to the RF chains 510, 520, 530, 540, and 550, based on the fifth magnitudes and the sixth magnitude, identify output powers in the reference PA lookup table, respectively corresponding to summated gains obtained by summating each of the peak-based gains and each of the gain offsets. According to an embodiment, the at least one instruction, when executed by the at least one processor 120, 212, 214, 564 and/or 567, may enable the modem 560 to, as at least part of identifying the saturated output powers respectively corresponding to the RF chains 510, 520, 530, 540, and 550, based on the fifth magnitudes and the sixth magnitude, identify each of differences between the output powers and the saturated output power of the reference PA lookup table. According to an embodiment, the at least one instruction, when executed by the at least one processor 120, 212, 214, 564 and/or 567, may enable the modem 560 to, as at least part of identifying the saturated output powers respectively corresponding to the RF chains 510, 520, 530, 540, and 550, based on the fifth magnitudes and the sixth magnitude, identify each of saturated output powers respectively corresponding to the RF chains 510, 520, 530, 540, and 550 by summating each of the fifth magnitudes and each of the differences.

According to an embodiment, the saturated output powers respectively corresponding to the RF chains 510, 520, 530, 540, and 550 may be identified based on a maximum and/or high value among the fifth values being the designated linearity threshold or more.

According to an embodiment, the at least one instruction, when executed by the at least one processor 120, 212, 214, 564 and/or 567, may enable the modem 560 to, as at least part of distorting and outputting the baseband signal based on the weights, identify a combined PA curve, based on the weights, the gains, and/or the saturated output powers. The at least one instruction, when executed by the at least one processor 120, 212, 214, 564 and/or 567, may enable the modem 560 to, as at least part of distorting and outputting the baseband signal based on the weights, identify a difference in gain between two PA curves and a difference in saturated output power between the two PA curves, based on a result of comparison between the combined PA curve and a reference PA curve.

According to an embodiment, the at least one instruction, when executed by the at least one processor 120, 212, 214, 564 and/or 567, may enable the modem 560 to, as at least part of distorting and outputting the baseband signal based on the weights, identify a first gain corresponding to a value obtained by applying the difference in saturated output power between the two PA curves to an input power value of the baseband signal by referring to a reference DPD lookup table. The at least one instruction, when executed by the at least one processor 120, 212, 214, 564 and/or 567, may enable the modem 560 to, as at least part of distorting and outputting the baseband signal based on the weights, identify a second gain by applying the difference in gain between the two PA curves to the first gain, and distort the baseband signal based on the second gain. The at least one instruction, when executed by the at least one processor 120, 212, 214, 564 and/or 567, may enable the modem 560 to, as at least part of distorting and outputting the baseband signal based on the weights, distort the baseband signal based on the second gain.

According to an embodiment, the at least one instruction, when executed by the at least one processor 120, 212, 214, 564 and/or 567, may enable the modem 560 to, as at least part of identifying the combined PA curve, based on the weights, the gains, and the saturated output powers, identify each of shifted reference PA curves respectively corresponding to the RF chains 510, 520, 530, 540, and 550, based on the gains and the saturated output powers. According to an embodiment, the at least one instruction, when executed by the at least one processor 120, 212, 214, 564 and/or 567, may enable the modem 560 to, as at least part of identifying the combined PA curve, based on the weights, the gains, and the saturated output powers, identify results of multiplying each of the weights respectively corresponding to the RF chains 510, 520, 530, 540, and 550 and each of the shifted reference PA curves respectively corresponding to the RF chains 510, 520, 530, 540, and 550. According to an embodiment, the at least one instruction, when executed by the at least one processor 120, 212, 214, 564 and/or 567, may enable the modem 560 to, as at least part of identifying the combined PA curve, based on the weights, the gains, and the saturated output powers, identify the combined PA curve by summating the results. "Based on" as used herein covers based at least on.

The electronic device according to various example embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An antenna module comprising:
   antennas;
   RF chains connected to the antennas;
   a splitter/combiner connected to the RF chains;
   a mixer configured to upconvert an IF signal input to the antenna module into a transmission RF signal and output the upconverted signal to the splitter/combiner and/or to downconvert a reception RF signal which is a combination of signals from the RF chains provided from the splitter/combiner;
   a plurality of first couplers connected between at least the RF chains and the antennas, each of the plurality of first couplers being disposed between at least the antennas and the splitter/combiner;
   a second coupler configured for measuring a magnitude corresponding to a transmission RF signal before split by the splitter/combiner and/or the reception RF signal combined by the splitter/combiner, the reception RF signal downconverted by the mixer and provided to an intermediate frequency IC connected to the antenna module, and the transmission RF signal generated at least by upconversion of the IF signal provided from the intermediate frequency IC by the mixer; and
   a power detector configured to provide a plurality of magnitudes of a plurality of signals from the plurality of first couplers and a magnitude of a signal from the second coupler.

2. The antenna module of claim 1, wherein the second coupler is connected between at least the mixer and the splitter/combiner.

3. The antenna module of claim 1, wherein the second coupler is connected to an input terminal of the mixer where the IF signal is to be provided.

4. The antenna module of claim 1, further comprising:
   at least one ADC configured to convert the plurality of magnitudes of the plurality of signals from the plurality of first couplers and the magnitude of the signal from the second coupler into a digital value; and
   an interface, comprising interface circuitry, configured to provide a plurality of digital values output from the at least one ADC to a modem.

5. The antenna module of claim 1,
   wherein each of a plurality of magnitudes of a plurality of first signals from the plurality of first couplers is to be identified based on respective average values of the plurality of first signals, and
   wherein a magnitude of a second signal from the second coupler is to be identified based on an average value of the second signal.

6. The antenna module of claim 5, wherein each of the plurality of magnitudes of the plurality of signals from the plurality of first couplers and the magnitude of the signal from the second coupler are to be identified based on the respective average values of the plurality of first signals and the average value of the second signal, based on a maximum and/or high value among respective signals of the RF chains provided from the splitter/combiner being less than a designated linearity threshold.

7. The antenna module of claim 1,
   wherein each of a plurality of magnitudes of a plurality of first signals from the plurality of first couplers is to be identified based on respective peak values of the plurality of first signals, and
   wherein a magnitude of a second signal from the second coupler is to be identified based on a peak value of the second signal.

8. The antenna module of claim 7, wherein each of the plurality of magnitudes of the plurality of signals from the plurality of first couplers and the magnitude of the signal from the second coupler are to be identified based on the respective peak values of the plurality of first signals and the peak value of the second signal, based on a maximum and/or high value among respective signals of the RF chains provided from the splitter/combiner being the designated linearity threshold or more.

* * * * *